United States Patent
Edwards

(10) Patent No.: US 11,042,619 B2
(45) Date of Patent: Jun. 22, 2021

(54) VEHICLE OCCUPANT TRACKING AND TRUST

(71) Applicant: Toyota Motor North America, Inc., Plano, TX (US)

(72) Inventor: Michael C. Edwards, McKinney, TX (US)

(73) Assignee: Toyota Motor North America, Inc., Plano, TX (US)

( * ) Notice: Subject to any disclaimer, the term of this patent is extended or adjusted under 35 U.S.C. 154(b) by 325 days.

(21) Appl. No.: 16/250,017

(22) Filed: Jan. 17, 2019

(65) Prior Publication Data
US 2020/0233940 A1 Jul. 23, 2020

(51) Int. Cl.
*G06F 21/32* (2013.01)
*H04L 9/06* (2006.01)
*G05D 1/00* (2006.01)

(52) U.S. Cl.
CPC ............ *G06F 21/32* (2013.01); *H04L 9/0637* (2013.01); *G05D 1/0061* (2013.01); *H04L 2209/38* (2013.01)

(58) Field of Classification Search
None
See application file for complete search history.

(56) References Cited

U.S. PATENT DOCUMENTS

| 8,635,091 | B2 | 1/2014 | Amigo et al. | |
|---|---|---|---|---|
| 8,977,408 | B1* | 3/2015 | Cazanas | B60R 16/037 701/2 |
| 9,760,702 | B1* | 9/2017 | Kursun | G06Q 20/4016 |
| 9,892,732 | B1* | 2/2018 | Tian | G01S 3/80 |
| 10,011,216 | B1* | 7/2018 | Rovik | G06K 9/00798 |
| 10,219,154 | B1* | 2/2019 | Hallock | H04L 63/083 |
| 10,250,597 | B2* | 4/2019 | Hoyos | G06F 16/955 |
| 10,743,280 | B1* | 8/2020 | Lekutai | H04W 76/10 |
| 2006/0253307 | A1* | 11/2006 | Warren | G06Q 40/08 705/4 |
| 2010/0049610 | A1* | 2/2010 | Ambrosio | G06Q 30/02 705/14.62 |

(Continued)

FOREIGN PATENT DOCUMENTS

| CN | 201711062438 | * 11/2017 |
|---|---|---|
| CN | 107657211 A | 2/2018 |

OTHER PUBLICATIONS

Hirego, "Decentralised Shared Mobility Platform", Revised Jun. 2018, 22 pages.

(Continued)

*Primary Examiner* — Piotr Poltorak
(74) *Attorney, Agent, or Firm* — Christopher G. Darrow; Darrow Mustafa PC

(57) ABSTRACT

Systems and methods for occupant authentication and trust using a blockchain are disclosed herein. The systems and methods can include receiving an occupant indicator and one or more occupant identifiers for an occupant in a vehicle. The one or more occupant identifiers can then be verified against identifying information stored in a blockchain ledger to authenticate the occupant. One or more occupant profile elements can then be collected for the occupant. Then, at least one of the one or more occupant identifiers and at least one of the one or more occupant profile elements can be recorded in the blockchain ledger.

20 Claims, 8 Drawing Sheets

(56) References Cited

U.S. PATENT DOCUMENTS

| | | | | |
|---|---|---|---|---|
| 2010/0222939 A1* | 9/2010 | Namburu | G07C 9/28 | 701/2 |
| 2010/0280704 A1* | 11/2010 | Eckhoff | B60K 6/44 | 701/31.4 |
| 2011/0137773 A1* | 6/2011 | Davis, III | G06Q 30/04 | 705/34 |
| 2013/0297099 A1* | 11/2013 | Rovik | B60R 16/037 | 701/2 |
| 2014/0306833 A1* | 10/2014 | Ricci | G06F 21/00 | 340/901 |
| 2016/0027079 A1* | 1/2016 | Schoeffler | G06Q 30/0609 | 705/325 |
| 2016/0046298 A1* | 2/2016 | DeRuyck | B60W 50/14 | 340/576 |
| 2016/0052391 A1* | 2/2016 | Walsh | B60K 28/066 | 340/575 |
| 2016/0283963 A1* | 9/2016 | Zafiroglu | G06Q 30/02 | |
| 2017/0178416 A1 | 6/2017 | Barreira Avegliano et al. | | |
| 2017/0187707 A1* | 6/2017 | Miu | H04L 9/3231 | |
| 2017/0213221 A1* | 7/2017 | Kurian | G06Q 20/38215 | |
| 2018/0172464 A1* | 6/2018 | Sekizawa | G01C 21/3617 | |
| 2018/0201226 A1* | 7/2018 | Falkson | G06F 21/32 | |
| 2018/0202822 A1 | 7/2018 | DeLizio | | |
| 2018/0211213 A1 | 7/2018 | Vivier | | |
| 2019/0092279 A1* | 3/2019 | Jarvis | G06Q 20/00 | |
| 2020/0074853 A1* | 3/2020 | Miller | G06F 16/182 | |
| 2020/0186510 A1* | 6/2020 | Kursun | H04L 63/08 | |

OTHER PUBLICATIONS

Makridakis et al., "Blockchain: Current Achievements, Future Prospects/Challenges and its Combination with AI", Faculty University of Nicosia, 2017, 21 pages.

* cited by examiner

VEHICLE OCCUPANT TRACKING AND TRUST

TECHNICAL FIELD

The subject matter described herein generally relates to user tracking and, more particularly, vehicle occupancy control in common-use vehicles.

BACKGROUND

Numerous people commute to work on a daily basis, which contributes to vehicle-based environmental issues such as congestion, harmful pollutants (such as nitrogen oxides, volatile organic compounds and carbon monoxide), and greenhouse gas emissions (such as carbon dioxide). These vehicle-related environmental problems can be alleviated by the use of public transportation or multiple occupant vehicles (such as carpooling). However, many people still prefer the convenience of commuting individually without passengers. Therefore, society can benefit from incentivizing ride sharing over single occupant vehicle commuting. Existing frameworks that promote ridesharing, such as high occupancy vehicle lanes, increase the convenience of ridesharing. However, reliably enforcing the use of high occupancy vehicle (HOV) lanes can be challenging. That is, the technical challenge is a reliable verification of the number of vehicle occupants in order to limit use of the HOV lanes to qualifying vehicles. Experience in the United States has shown that police checkpoints are often lax, expensive, and generally ineffective at preventing fraudulent use by individual riders in HOV lanes, which can be as high as 30%. This fraudulent use increases traffic in the HOV lanes and detracts from the use of such lanes by honest riders.

SUMMARY

Disclosed herein are systems and methods for monitoring vehicle occupants using a blockchain registry. In one or more implementations, an occupant verification system for occupant authentication and trust is disclosed. The occupant verification system can include one or more processors; and a memory communicably coupled to the one or more processors. The memory can store a communication module including instructions that when executed by the one or more processors cause the one or more processors to receive, from a vehicle, a verification request that includes at least an occupant identifier that uniquely identifies a designated occupant and a vehicle identifier that uniquely identifies the vehicle. The memory can further store an evaluation module including instructions that when executed by the one or more processors cause the one or more processors to in response to verifying, in a blockchain, that the occupant identifier and the vehicle identifier correspond with identifying information for the designated occupant and the vehicle, record, in the blockchain, an entry indicating an occupant identity, a vehicle identity, and that the designated occupant is present in the vehicle. The memory can further store an occupant analysis module including instructions that when executed by the one or more processors cause the one or more processors to using the verified occupant identity, collect one or more occupant profile elements that indicate trustworthiness of the designated occupant, including historical elements and personality profile elements about the designated occupant, the occupant profile elements being incorporated into the blockchain, and to distribute the verified occupant identity, the vehicle identity, and the occupant profile elements to one or more end users.

In further implementations, a non-transitory computer-readable medium for occupant authentication and trust is disclosed. The non-transitory computer-readable medium can store instructions that when executed by one or more processors cause the one or more processors to receive, from a vehicle, a verification request that includes at least an occupant identifier that uniquely identifies a designated occupant and a vehicle identifier that uniquely identifies the vehicle. The non-transitory computer-readable medium can further store instructions to, in response to verifying, in a blockchain, that the occupant identifier and the vehicle identifier correspond with identifying information for the designated occupant and the vehicle, record, in the blockchain, an entry indicating an occupant identity, a vehicle identity, and that the designated occupant is present in the vehicle. The non-transitory computer-readable medium can further store instructions to, using the verified occupant identity, collect one or more occupant profile elements that indicate trustworthiness of the designated occupant, including historical elements and personality profile elements about the designated occupant, the occupant profile elements being incorporated into the blockchain. The non-transitory computer-readable medium can further store instructions to distribute the verified occupant identity, the vehicle identity, and the occupant profile elements to one or more end users.

In further implementations, a method for occupant authentication and trust is disclosed. The method can include receiving, from a vehicle, a verification request that includes at least an occupant identifier that uniquely identifies a designated occupant and a vehicle identifier that uniquely identifies the vehicle. The method can further include, in response to verifying, in a blockchain, that the occupant identifier and the vehicle identifier correspond with identity information for the designated occupant and the vehicle, recording, in the blockchain, an entry indicating an occupant identity, a vehicle identity, and that the designated occupant is present in the vehicle. The method can further include, using the verified occupant identity, collecting one or more occupant profile elements that indicate trustworthiness of the designated occupant, including historical elements and personality profile elements about the designated occupant, the occupant profile elements being incorporated into the blockchain. The method can further include distributing the verified occupant identity, the vehicle identity, and the occupant profile elements to one or more end users.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate selected implementations of this disclosure and are therefore not to be considered as comprehensive of possible implementations or limiting of its scope.

To facilitate understanding, identical reference numerals have been used, wherever possible, to designate identical elements that are common to the figures. Additionally, elements of one or more implementations may be advantageously adapted for utilization in other implementations described herein.

DETAILED DESCRIPTION

Figure 1:
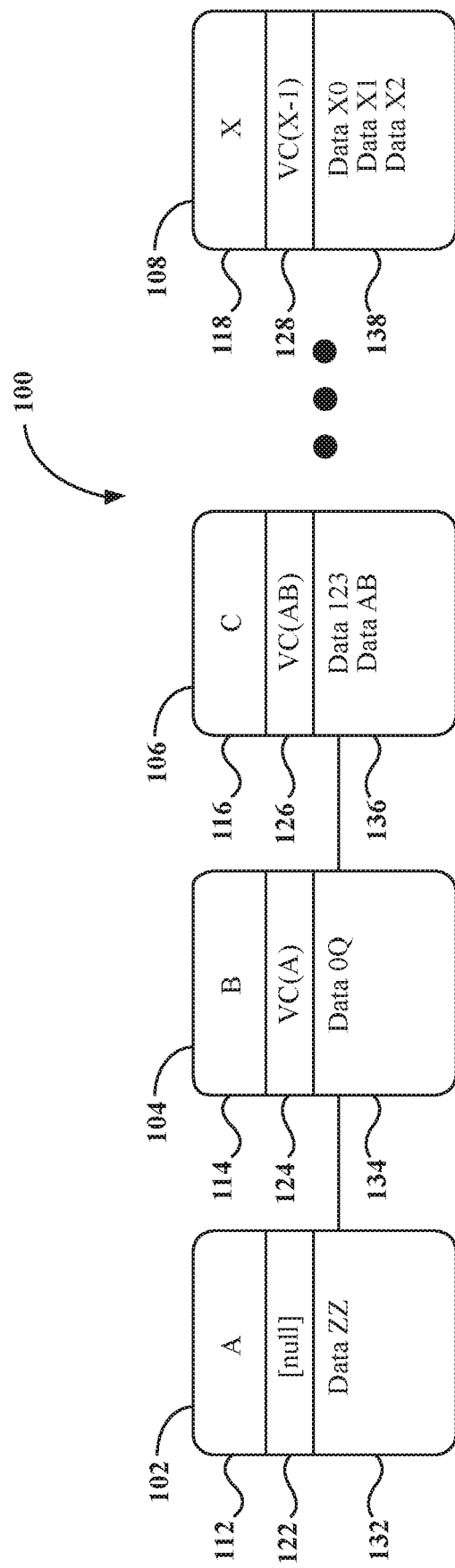
FIG. 1 is an example of a blockchain adaptable for use with an occupant verification system, according to some implementations.

The implementations disclosed herein generally relate to systems and methods for monitoring vehicle occupancy using a blockchain-based occupant verification system. In one or more approaches as discussed herein, a blockchain can be a system that securely and immutably stores data. In general, blockchains create a history of transactions in a series of blocks where each block includes a verification code. In some implementations, the verification code is a hash. A hash is a mathematical summary of the previous block, and the process of producing a hash is called hashing. Hashing is a form of cryptographic security where a single unique string of a specific size is produced with relation to the information in the blockchain and the individual blocks respectively, making it difficult to reverse or decrypt. The hashes are one-way, meaning non-reversible. Thus, the hashes, and the verification codes more generally, can make the blockchain more secure against tampering. The system uses the relationships between blocks and hashes to form a secure chain where subsequent blocks in a blockchain effectively secure prior blocks through storing the hash/identifier of the prior block while also incorporating the hash as an integral aspect of the current block. The blockchain database, in one approach, can store occupant and vehicle identifiers within blocks of a blockchain, as well as tiered and correlated branches about the occupant interactions, the vehicle and occupant history, personality traits, locations, and other information relevant to the determination of occupants.

Implementations described herein can authenticate occupants of a vehicle, including incorporating occupant indicators, such as ID numbers and identifying information. One or more implementations described herein can include blockchains for storage of data in relation to users and vehicles. Upon entering a vehicle, the vehicle can receive an indicator of occupant presence and authenticate the occupant according to their ID on an associated blockchain. The vehicle may collect or authenticate one or more occupant identifiers from the blockchain. Occupant identifiers can include various identifying information about an occupant such as prior rides, criminal history, passport information, driver's license information, and so on. The system uses the occupant identifiers to add the occupant to a blockchain ledger that is associated with the vehicle ID as a record in the blockchain. The system can then use the blockchain ledger as an authenticated group identifier of the vehicle and occupant combination to provide for automated authorization for a variety of automotive tasks, such as passing through vehicle checkpoints, HOV lane access, and minimum occupant number verification.

In further implementations, the occupant verification system can include the collection or verification of one or more occupant profile elements. Occupant profile elements can include various characteristics, behaviors, or mannerisms which can speak to the safety or trustworthiness of the occupant. Occupant profile elements can include criminal history, previous positive or negative interactions during a ridesharing event or others. The system can then analyze this information to ensure the person can be trusted and is properly identified. Thereafter, the system can facilitate HOV lane use, trust between occupants of a rideshare, tolls based on occupancy, border crossings/customs information, and so on. Using the stored information on the blockchain, the system can create a distributed immutable record both for immediate use (e.g., border crossing, HOV lane access, and access during evacuations) and for later record keeping and statistical information. As well, the occupant verification system can In the context of HOV, the system can automatically verify the presence of a proper number of people in a vehicle. In some implementations, the system can determine occupancy regardless of the identification of the occupant. The system can be configured to collect biometric data, environmental data (e.g., sounds, voices, visual input, etc.), or other indicia which can be applied to determine the presence of an occupant and to differentiate between occupants in the vehicle. Through this gross data collection, the system can determine the number of occupants present in the vehicle, thus validating a vehicle for HOV lane use or for secondary safety measures (e.g., possible criminal activity from a hidden person in a vehicle).

In the context of ridesharing, the system can verify the identity and history of the user to facilitate trust between ridesharing users. The system can apply a known identity to determine other associated trustworthiness factors about a potential rideshare occupant. Associated trustworthiness factors collected by the system can include behavioral data, previous criminal history, known associations, or heuristic determinants to provide safety information. The system can further store the associated trustworthiness factors, as well as interactions in previous rideshare situations, as part of a block in the blockchain. Thus, the system can create a distributed and immutable record of occupant trustworthiness and history alongside occupant identity. Thus, through the distributed record, the system can further increase safety in situations where the occupants may not know one another or have other safety concerns regarding rideshares. As further indicated, the system may automatically provide information to customs/border officials to facilitate passage between countries.

In this way, the system improves occupant experience by clearly and verifiably identifying the occupants through an immutable distributed ledger. The occupant identity information is collected and verified followed by the creation of an immutable distributed record in the blockchain. Thus, occupants are not required to provide identification at multiple stops on a trip. Further, frequent occupants can enjoy the benefits of the distributed record, such as minimal verification steps in light of the record already stored on the blockchain. The system further increases safety and comfortability by providing relevant trustworthiness information, both by system determination and historical information, to other occupants. The accumulated information about the occupants, as stored in the blockchain, provides a wealth of information regarding behavior and trustworthiness. The system can access and process this information to provide guidance about the trustworthiness of one occupant to another. Though this trustworthiness information, the system can provide occupants a level of comfort and safety which would otherwise be unavailable. The implementations disclosed herein are more clearly described with reference to the figures below.

FIG. 1 depicts an example of a blockchain 100, according to some implementations. Each subsequent block in the blockchain 100 generally includes a block ID, verification code, and a data field. The blocks, as identified by the block ID, can include a data field. The data field can hold the data elements, such as the fuel measurements, ride histories, payment information, user experience information, and other information of the occupant verification system. Once the system has added the desired data for that block, the system generates a verification code from the data in the block and one or more subsequent blocks. The system can generate the verification code from data in the block, such as data in the data field. The verification code thus represents the data as stored, which makes that data unable be changed or altered without the alteration being recognized.

The exemplary blockchain 100 starts with block A 102. Block A 102 includes a block ID 112, a verification code field 122, and a data field 132. The block ID 112 is a sequence which identifies the block A 102. The block ID 112 can be a unique sequence with respect to the other blocks in the blockchain 100. The block A 102 can further include the verification code field 122. The verification code field 122 can store a verification code. The verification code can be a unique sequence which is mathematically generated using the previous block as an input. The verification code can be a hash, chameleon hash, or others which represent the data as stored. The verification codes presented here are for exemplary purposes and are not intended to be limiting of possible size or permutations of the verification sequences in the blocks of the blockchain 100. As the block A 102 is the first block in the blockchain 100, the verification code field 122 can be empty. In further examples, the verification code field 122 has a verification code generated based on the data only in the block A 102 or using other identifying factors, such as time stamp or data origin. The data field 132 can be a generic sequence of digital input from a variety of sources. The data field 132 can further be of varying sizes, as limited by the block size of the blockchain 100, including being empty.

Block B 104 includes a block ID 114, a verification code field 124, and a data field 134. The block ID 114 can be substantially similar to the block ID 112. The block B 104 further has a verification code VC(A), in the verification code field 124. The verification code is generated from the content of previous block A 102, which serves as an input for generation of the verification code. The content of block A 102 used in the determination of the verification code VC(A) can include any or all of the fields within block A 102, such as data ZZ in the data field 132, the [null] verification code in the verification code field 122, or the block ID 112. The data field 134 of the block B 104 may be used to store any type of data. For example, the data field 134 can hold account data, version data, links, pointers, archived data, currency value, personal data, contract terms, transaction data, documents, other data, or combinations thereof.

The blocks of the blockchain 100 can be locked to one another via the verification codes. In one sense, the blocks are locked to one another with respect to the verification code, because the verification codes in each of the blocks are generated including the content in one or more of the previous blocks at the time the verification code was generated. As such, modifications to a previous block after a current block is added will create evidence of modification. Specifically, the change will be inconsistent with the verification code as generated using the previous data and stored in the current block. Hence, the content of the respective block is locked once a subsequent block with a generated verification code is added to the blockchain 100.

Block C 106 includes a block ID 116, a verification code field 126, and a data field 136. The block ID 116 can be substantially similar to the block ID 112. In this example, the data field 136 includes Data 123 and Data AB. The block C 106 further has a verification code VC(AB), in the verification code field 124. The verification code is generated from the content of previous block A 102, the previous block B 104, or combinations thereof. The content of block A 102 and block B 104 used in the determination of VC(AB) may include any or all of the fields within block A 102 and block B 104. In further implementations, the verification code in the verification code field 126 can include the previous block (e.g., block B 104) and any further information desired (e.g., any elements of block A 102).

Block X 108 represents all further blocks in the example blockchain 100. Block X 108 includes a block ID 118, a verification code field 128, and a data field 138. Block X 108 can be substantially similar to block A 102, block B 104, block C 106 or combinations thereof. The verification code for the verification code field 128 is generated from the content of previous block A 102, the previous block B 104, the previous block C 106, other blocks, or combinations thereof. The verification code can be generated using data from some blocks while skipping other blocks (e.g., a verification code generated using data ZZ from block A 102, Data AB and the verification code VC (AB) from block C 106, and no data from block B 104). Fields in the blocks (e.g., blocks 102, 104, 106, and 108) that are not used to determine the verification code in subsequent blocks are not necessarily protected by the blockchain 100. For example, you can modify these fields without creating coding inconsistencies between the blocks. In addition, if the verification code field (e.g., verification code fields 122, 124, 126, and 128) is not used when determining the verification code of the next block of the character string, the blockchain does not necessarily guarantee the coding consistency between the above blocks, because the unsafe verification code can be modified without generating evidence of inconsistency.

Thus, in various implementations, at least one secure portion of the verification code field and the data field of the block is used to determine the verification code for the next block (e.g., the subsequent block in the blockchain). In this example of a blockchain, the content of block B 104 may be locked once block C 106, which contains a verification code generated using VC(AB) in verification code field 126, is added to the blockchain 100. As a result, the content of block A 102 which was locked by block B 104 is further secured by block C 106 because block C 106 prevents block B 104 from being changed without producing evidence of tampering. Thus, the blockchain 100 can be used to produce a secure database of the collected data in blocks which are tamper resistant.

Figure 2:
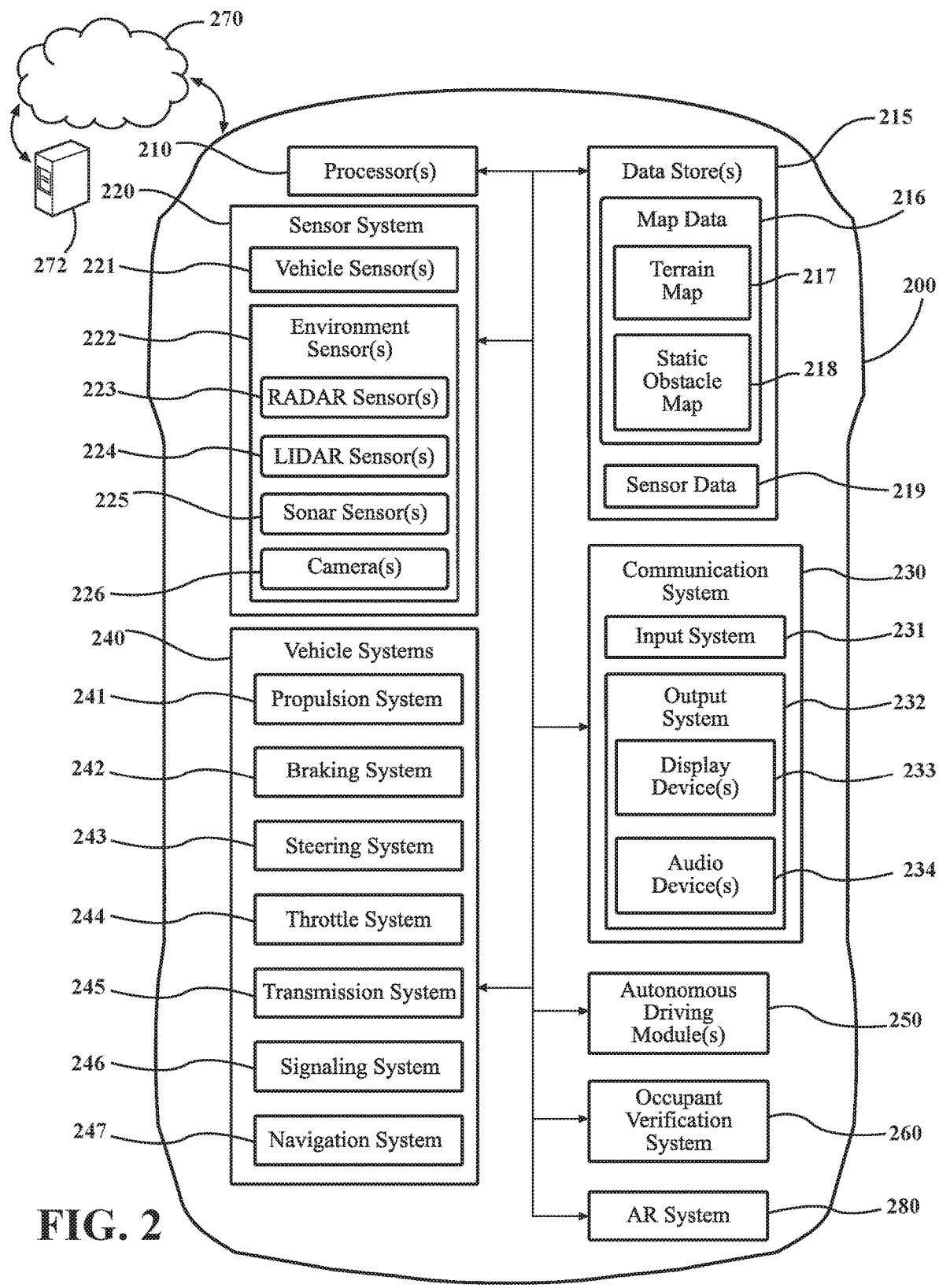
FIG. 2 is a block diagram of a vehicle incorporating an occupant verification system, according to implementations described herein.

Referring to FIG. 2, an example of an autonomous device, specifically a vehicle 200, is illustrated. The vehicle 200 can include an occupant verification system 260 or components and modules thereof. As used herein, a "vehicle" is any form of motorized transport. In one or more implementations, the vehicle 200 can be an automobile. In some implementations, the vehicle 200 may be any other form of motorized transport that, for example, can operate autonomously, semi-autonomously, or manually by an in-vehicle operator. The vehicle 200 can include the occupant verification system 260 or capabilities to support or interact with the occupant verification system 260, and thus benefits from the functionality discussed herein. While arrangements will be described herein with respect to automobiles, it will be understood that implementations are not limited to automobiles, but any form of vehicle or device capable of being occupied. Instances of the vehicle, as used throughout, are equally applicable to any device capable of incorporating the systems or methods described herein.

The vehicle 200 also includes various elements. It will be understood that, in various implementations, it may not be necessary for the vehicle 200 to have all of the elements shown in FIG. 2. The vehicle 200 can have any combination of the various elements shown in FIG. 2. Further, the vehicle 200 can have additional elements to those shown in FIG. 2. In some arrangements, the vehicle 200 may be implemented without one or more of the elements shown in FIG. 2. While the various elements are shown as being located within the vehicle 200 in FIG. 2, it will be understood that one or more of these elements can be located external to the vehicle 200. Further, the elements shown may be physically separated by large distances.

Figure 3:
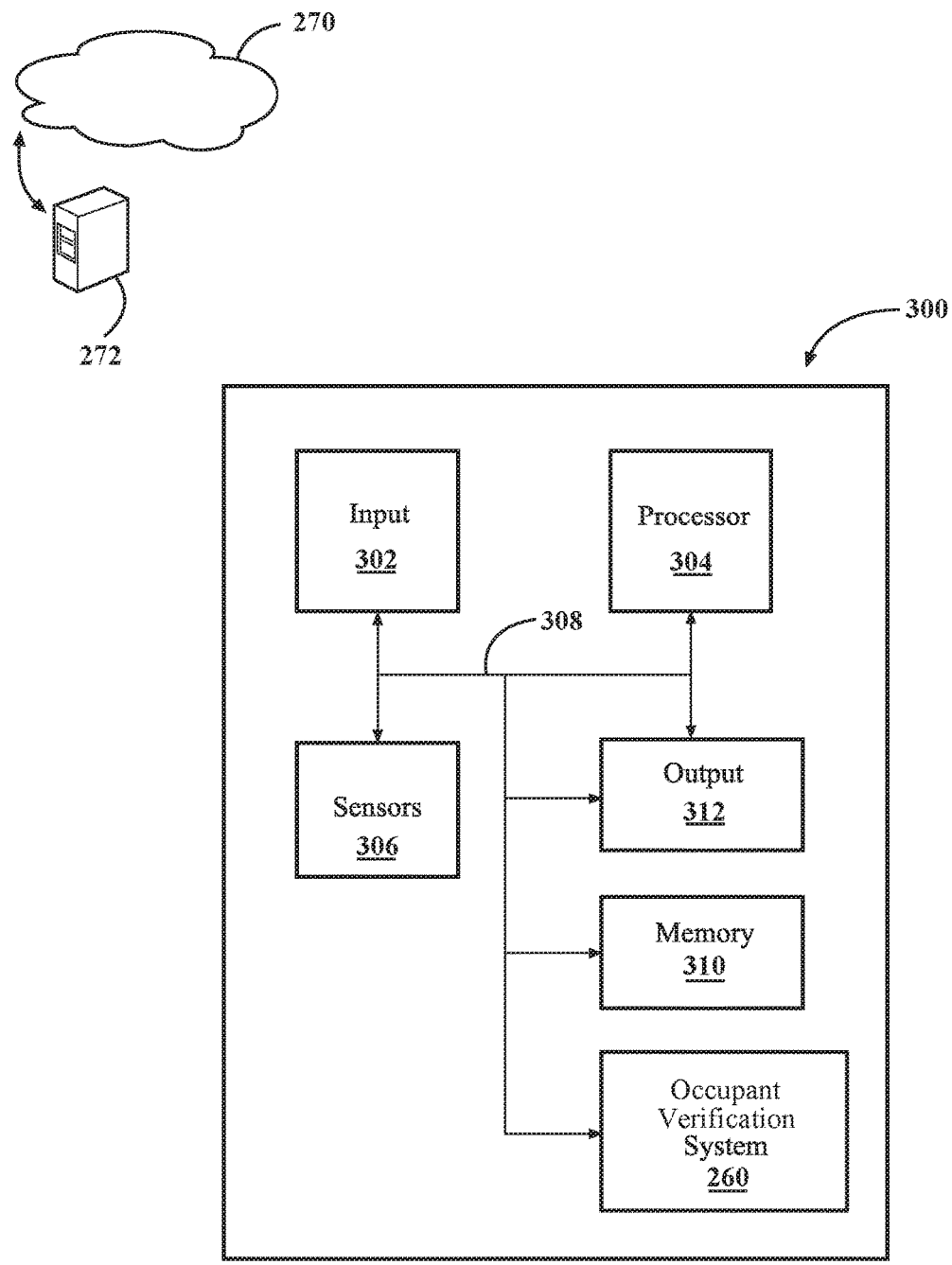
FIG. 3 is a block diagram of a computing device incorporating an occupant verification system, according to implementations described herein

FIG. 3 is an example of a computing device 300. The computing device 300 can include any programmable electronic device designed to accept data, perform mathematical or logical operations under the control of software. The computing device 300 can include the occupant verification system 260 or capabilities to support or interact with the occupant verification system 260, and thus benefits from the functionality discussed herein. In implementations described herein, the vehicle 200 can be in communication with a computing device 300. The vehicle 200 or other device being in communication with the computing device 300 refers to any forms of direct or indirect communication between the computing device 300 and the vehicle 200, including direct wired communication, communication through one or more intermediary computing devices, communication through the cloud, or combinations thereof. The computing device 300 and the vehicle 200 can communicate through the use of a variety of wired or wireless networks. In some implementations, the computing device 300 is a server which is remote from the vehicle 200. In further implementations, the computing device 300 can be integrated into the vehicle 200, such as an embedded system. The computing device 300 can include an occupant verification system 260 that is implemented to perform methods and other functions as disclosed herein.

Some of the possible elements of the vehicle 200 and the computing device 300 are shown in FIG. 2 and FIG. 3 respectively. These elements will be described herein, along with subsequent figures. However, a description of many of the elements in FIG. 2 and FIG. 3 will be provided after the discussion of FIGS. 4-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the implementations described herein. Those of skill in the art, however, will understand that the implementations described herein may be practiced using various combinations of these elements.

Figure 4:
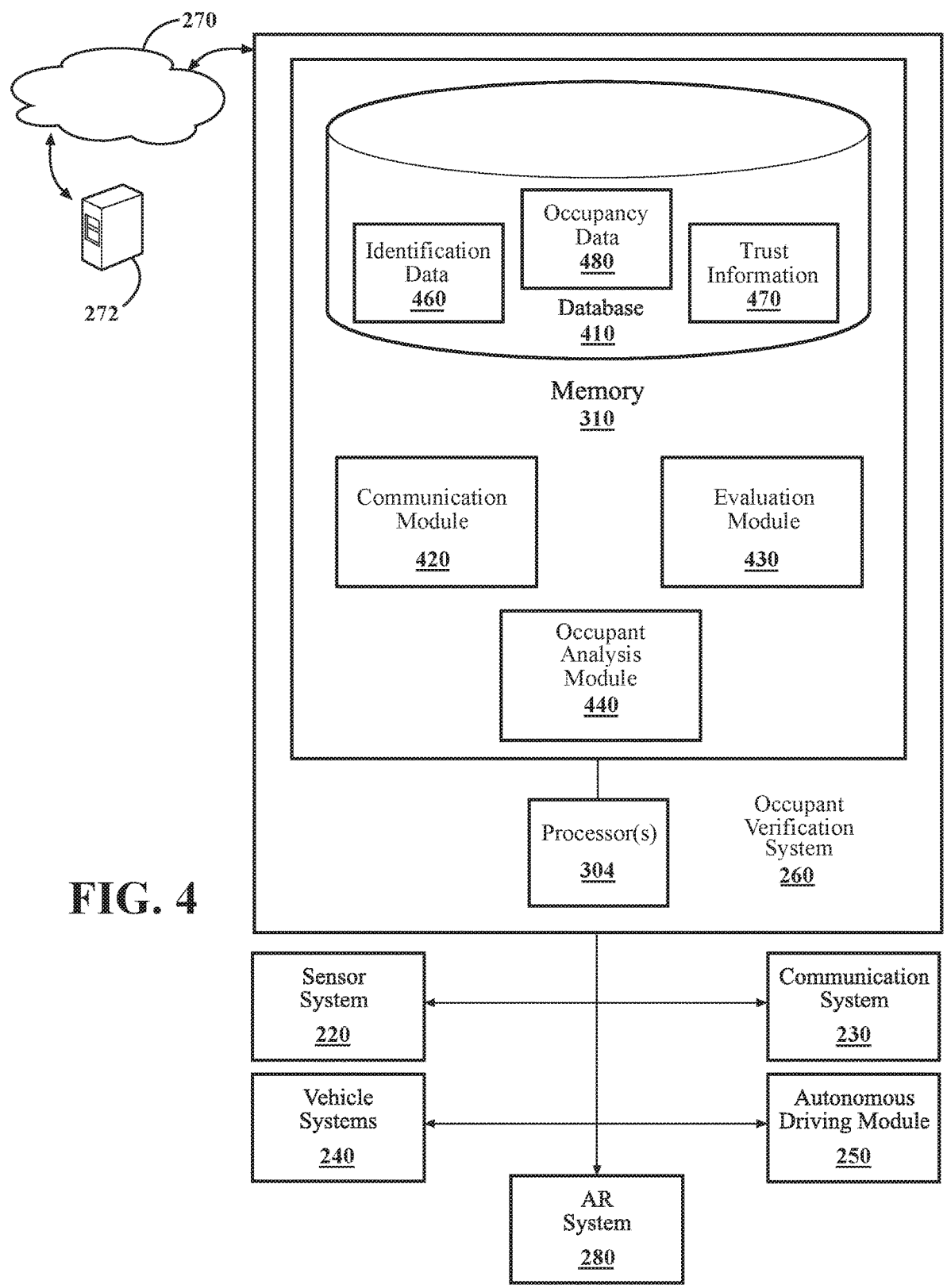
FIG. 4 is an occupant verification system for reputation-based device communication, according to one or more implementations.

The occupant verification system 260 is more clearly described with reference to FIG. 4. The occupant verification system 260 can include one or more modules which integrate the distributed and immutable nature of a blockchain to evaluate and authenticate occupancy in a vehicle, to validate identity information received with relation to the one or more occupants, to evaluate trustworthiness of said occupants, and/or forward to one or more modules or systems for authentication of occupant identity and quantity. The occupant verification system 260 is shown as including a processor 304 from the computing device 300, depicted in FIG. 3. Accordingly, the processor 304 can be a part of the occupant verification system 260, the occupant verification system 260 can include a separate processor from the processor 304 of the computing device 300, the processor 210 of the vehicle 200, or the occupant verification system 260 can access the processor 304 or the processor 210 through a data bus or another communication path.

In one implementation, the occupant verification system 260 includes the memory 314 that stores the communication module 420, the evaluation module 430, and the occupant analysis module 440. The memory 314 can be a suitable memory for storing the modules 420, 430, and 440. The modules 420, 430, and 440 are, for example, computer-readable instructions that when executed by the processor 304, cause the processor 304 to perform the various functions disclosed herein. The memory 314 can further include a database, such as a database 410. The database 410 can include data or information for use as part of the implementation of the occupant verification system 260 described herein. The database 410 can include data or information collected, formulated, processed, derived, or manipulated from a variety of sources. In one or more implementations, the occupant verification system 260 can include the identification data 460, the trust information 470, and the occupancy data 480.

The database 410 can further include the blockchain ledger. Any of the one or more data or information components stored in the database 410 can be stored as a block in the blockchain ledger, as described herein. The occupant verification system 260 can incorporate the data or information into one or more blocks. The blocks can receive a verification code, such as a hash. Then, the occupant verification system 260 can forward the block and the verification code to other recipients in the network, for verification and incorporation into the blockchain ledger. The distribution of the information and data can create a distributed record of interactions between multiple occupants and multiple vehicles. This distribution can help prevent improper identifications of occupants, through checking for redundant entries which are questionable due to timing or geography. Further, the distributed database provides for a variety of data analytics which can be corroborated between participants on the network.

The communication module 420 can generally include instructions that function to control the processor 304 to receive, from a vehicle, a verification request that includes at least an occupant identifier that uniquely identifies the designated occupant. The verification request is a request or indicator which indicates to the occupant verification system 260 that the occupant verification system 260 can begin the identification and evaluation of occupants in the vehicle. The verification request can include an occupant indicator. The occupant indicator generally relates to any indication an occupant exists within the vehicle. In one or more implementations, the communication module 420 can determine or record an occupant indicator based on one or more occupant(s) entering, existing within, or exiting the vehicle. In one or more further implementations, the communication module 420 can determine or record the occupant indicator immediately upon the occupant(s) entering the detectable range, immediately upon crossing a certain threshold, or after a period of time. The period of time can be based on a logical event, such as a period of time related to assuring that the person will remain within the vehicle. The period of time can further include a designated time frame from an input source, such as by one or more user(s), the occupant(s), or the system. In further embodiments, the period of time can be a random time frame.

The communication module 420 can determine or receive the verification request based on one or more indicia of an occupant's presence, such as visual based detection, biometrics, receipt of wireless signal, object recognition. As well, the communication module 420 can determine or receive the verification request based on more direct or active forms of initiation of the occupant verification system 260 (e.g., a command or request from the occupant to initiate the occupant verification system 260). In one or more further implementations, the verification request can be a combination of events. In some examples, the verification request can include the actuation of or interaction with a vehicle component, such as crossing a certain weight threshold as detected by the seat, the opening of the door, starting the engine, depressing the brake, or other mechanical indicators which would indicate one or more occupant(s) being in the vehicle.

In some implementations, the communication module 420 can further include instructions to receive the occupant indicator from the occupant, such as through an identification device. The identification device can generally include a device which conveys data or information to the communication module indicating that the occupant is present in the vehicle. Identification devices can include devices mounted or integrated into the vehicle, such as a touchscreen in the console, personal communication device (e.g., a smartphone), a radio-frequency identification (RFID) device, or others. The identification device can provide or transmit the occupant indicator as an affirmative indication of the presence of the one or more occupant(s). The occupant indicator can be provided to the communication module 420 in response to a request or impromptu. In this way, the occupant verification system 260 can, actively and/or passively, receive and/or detect the occupant indicator, which can allow for further determination of the occupant characteristics described herein.

The communication module 420 can further include instructions to collect and/or receive one or more occupant identifiers. The one or more occupant identifiers, as used herein, are facts, features, indicia, associations, or others which tend to indicate or are determinative of the identity of the occupant. In one or more implementations, the occupant identifiers can include facial features or recognition data, prior vehicle interaction, data as derived from a government-issued identification (ID), law enforcement reports or other government interactions, self-reported information (e.g., an occupant reporting a name and address), data from associated devices (e.g., a cell phone), or others. In one example, the occupant identifiers can include at least one of the prior vehicle interaction, criminal history, passport, driver's license (or other government-issued ID), or combinations thereof. The occupant indicator and/or the one or more occupant identifiers can then be stored as part of the identification data 460, as shown here in the database 410.

The communication module 420 can receive, select, and/or concatenate the occupant identifiers based on the level of identification desired and/or required for the intended purpose and/or intended recipient. In one example where the intended recipient is a law enforcement officer, such as for border crossing, the communication module 420 can collect occupant identifiers including a high-level verification. In one example of a high-level verification, the communication module 420 can select a government-issued ID as one of the occupant identifiers. In another example where the intended recipient is an enforcement system, such as for HOV lane, the communication module 420 can collect occupant identifiers including a low-level verification. One example of low-level verification can include one or more forms of identification which do not require a specific identity, such as person-level verification (e.g., a verification of two or more individuals in the vehicle). In some examples, the communication module 420 can determine person-level verification using biometrics. Biometrics, as used herein, generally relate to measurements of biological and/or biochemical activities, such as heartbeat, body warmth, blood oxygenation levels, biochemical markers of respiration, others, and/or combinations thereof.

In further examples of person-level or individual-level verification, the communication module 420 can collect occupant identifiers by applying object recognition to the one or more occupants. Object recognition generally relates to finding a given object (e.g., an occupant in a vehicle) in an image or a sequence of frames in a video segment. In one or more implementations, object recognition can include facial recognition. Temporally proximate features can have high temporal correlations, which can be identified within the sequence of frames. Each successive frame contains a temporally proximate representation of an object. Object recognition can be based on a model of the object at some level of abstraction. Object representations, also referred to as the "view," can change from frame to frame due to a variety of object transformations, such as rotation, movement/translation, change in lighting, background, noise, the appearance of other objects, partial blocking/unblocking of the object, etc. The object representations can then be then compared against known models or features, such as to determine either the object class (e.g., person-level recognition), specific object (e.g., individual-level recognition) or both. This model can then be matched to an object representation which has been abstracted to the same level as the model.

The communication module 420 can further include instructions to receive a vehicle identifier that uniquely identifies the vehicle. The vehicle identifier is a numerical or descriptive indicator which uniquely identifies a vehicle within the blockchain ledger. The communication module 420 can determine the vehicle identifier based on descriptive indicators, such as active location, type of vehicle, known ownership, physical description of the vehicle, or other physical or geographical characteristics of the vehicle. The communication module 420 can further apply vehicle-specific codes as the vehicle identifier, such as the VIN, a MAC address or one or more network-connected components in the vehicle, a generated code for the vehicle, or others.

The evaluation module 430 can generally include instructions that function to control the processor 304 to verify one or more occupant identifiers as part of the blockchain. The evaluation module 430 can include instructions to reference known information or indicia which are stored in blocks of the blockchain ledger. The blocks can contain authenticity data about one or more of the occupants. The authenticity data can include previously collected and stored information about a variety of vehicles and occupants which have interacted with the occupant verification system 260. The blocks can be stored and organized for easy reference by the occupant verification system 260 and secured by a verification code which incorporates information from the previous block. The authenticity data, as stored in the blocks of the blockchain, can include any of a variety of details as captured or provided during a previous interaction with the occupant verification system 260 including biometrics, location data, routes, conversations, other occupants and interactions with those occupants, driving behaviors, personality profile data, or others. The evaluation module 430 can further secure the authenticity data in conjunction with the occupant identity and one or more vehicle identities, as previously determined, to further assist in retrieval for comparison.

The evaluation module 430 can then compare the occupant identifiers, as described above, to the authenticity data to corroborate the occupant identifiers as presented. In some implementations, the data of the occupant identifiers as well as metadata about the occupant identifiers can be verified the authenticity data and against known or trusted data in secondary sources. In one example, the occupant identifier can be a government-issued ID which includes a variety of numerical indicators of the person's identity as well as metadata about the government-issued ID (e.g., specific placement of the numbers or pictures, anti-tampering devices, microprint, or others). In this example, the evaluation module 430 can reference the blockchain ledger for authenticity data.

The evaluation module 430 can then compare the government-issued ID and/or components thereof to known local or remote secondary data and the authenticity data to verify the government-issued ID and authenticate the occupant. Secondary data can be any data available to the evaluation module 430 such that the occupant identifiers can be verified, such as government databases, prior ride history, anti-fraud elements, collected biometrics, known patterns, or other data available outside of the blockchain which can be used to independently verify the one or more occupant identity elements and make an authenticity determination. Authenticity data and/or the secondary data need not be directly related to the occupant identifiers. Using the government-issued ID as an example, the authenticity data for government-issued ID can be used to verify the ID, while secondary data including biometric data and/or object recognition data (e.g., facial recognition) contradicts the association of said government-issued ID with the occupant. The authenticity data, secondary data, and the occupant identifiers or portions thereof, can be stored as part of the occupancy data 480, as shown here in the database 410.

The evaluation module 430 can further include instructions to record, in the blockchain, an entry indicating the occupant identity and that the designated occupant is present in the vehicle. The evaluation module 430 can, in response to verifying, in a blockchain, that the occupant identifier and the vehicle identifier correspond with identifying information for the designated occupant and the vehicle, record the above-described information and data, or portions thereof, into one or more blocks for the blockchain ledger. The block(s) can include the above information and data, organized in a fashion which allows for storage and/or retrieval of the data in the block. The evaluation module 430 can organize the data with relation to the vehicle(s), the occupant(s), one or more locations or destinations, environmental factors, or other conceivable arrangements or organizations. The blocks can then receive a verification code related to previous data in the blockchain ledger. The organization of the data in the various blocks can assist the occupant verification system 260 in future data retrieval and referencing of identification for other members of the network. The verification code can include information from blocks directly in line with the new block(s) or from branches within the blockchain ledger. Further, the verification code can be used to incorporate related data to that contained in the block, such as for further association in the blockchain ledger. The evaluation module 430 can then store the new blocks in the database 410 as part of the blockchain ledger described herein.

The occupant analysis module 440 can generally include instructions that function to control the processor 304 to collect one or more occupant profile elements that indicate the trustworthiness of the designated occupant. Occupant profile elements, as used herein, relates to data, information, behaviors, mannerisms, or other details which speak to trustworthiness or safety in relation to the occupant. It is understood that when an occupant enters a ridesharing situation with another occupant, a certain level of trust is required between the occupants to reasonably assure or otherwise convey safety and comfortability. The evaluation module 430 can thus include instructions to determine profile elements about the occupants which can indicate to one occupant that another occupant is safe or otherwise trustworthy. In further embodiments, occupant profile elements may be selected to satiate known bias or concerns, without regard to whether the occupant profile element is otherwise innocuous or not. In some examples, the occupant profile element can be gender, such as in the case of women seeking to ride with other women, or alcohol use, such as in the case of religious considerations. Occupant profile elements can include criminal history, personality, behavior, known associations, or other factors which can be used to evaluate the occupant. In one or more implementations, the occupant profile elements can then be reviewed or compared against known elements to determine if there is a match between the occupants. In some examples, the occupant profile elements can be reviewed or evaluated by the evaluation module 430, the occupant verification system 260, one or more other occupants, one or more users of the occupant verification system 260 or components thereof, or combinations thereof.

In yet further implementations, the occupant verification system 260 can further include instructions to plan a shared ride with additional occupants. The occupant verification system 260 can provide travel information between verified occupants, including profile information about other occupants as part of a ridesharing program. The occupant verification system 260 can further include instructions to select one or more occupants in light of their standard routes or travel organizations as potential matches. Thus, the occupant verification system 260 can further leverage the information from the blockchain ledger to provide better options to the occupants for ridesharing.

The occupant analysis module 440 can further include instructions to incorporate the occupant profile elements into the blockchain ledger. The occupant analysis module 440 can further incorporate one or more blocks into the blockchain ledger regarding the occupant profile elements. The occupant profile elements can be incorporated with the occupant identifiers or separately from the occupant identifiers. The occupant analysis module 440 can incorporate the occupant profile elements into preexisting blocks (such as prior to generating the verification code) or into new blocks. The occupant analysis module 440 can then generate the verification code for the new block and distribute the block to other devices on the network. Through the use of the blockchain ledger, the occupant profile elements can be made available in a secure and distributed fashion to other devices on the network. Thus, the occupant analysis module 440 can help address safety concerns quickly and efficiently, while verifying the reliability of the saved data as unadulterated from the point of collection to the present. In further implementations, blockchain ledger can be a single blockchain, multiple blockchains, a blockchain which references other blockchains or databases, or another form of ledger which can be used in organization and concatenation of occupant information and vehicle information.

The blocks and the related hashes of the blockchain ledger are configured such that the blockchain ledger can be shared across the network while maintaining the integrity of said blockchain ledger. The blocks of the blockchain ledger are discrete portions of information which can be related to the one or more occupants, including the one or more occupant identifiers and the one or more occupant profile elements, one or more associated vehicles, or other occupant-related information. Each time a block is added to the blockchain occupancy ledger, the blockchain occupancy ledger can be verified as described above, including the verification code.

The occupant analysis module 440 can further include instructions to distribute the verified occupant identity, the vehicle identity, and the occupant profile elements to one or more end users. The one or more end users can be a devices connected to the network or a person, through the use of an occupant responsive device. The occupant responsive device can be any device which is capable of receiving and/or presenting the information or data contained in the blockchain ledger. The occupant responsive device can be a component of the device or system, where the device or system need not be dedicated to the function of the occupant responsive device. In one example, the occupant responsive device can be a handheld device, a communication system in a vehicle, an autonomous system for monitoring traffic, or others.

The occupant analysis module 440 can further include instructions to provide a guarantee to an occupant responsive device. In some implementations, the occupant responsive device can be a device for the end user for confirming occupant related criteria. The guarantee can be an assurance of the accuracy of the received information. The occupant analysis module 440 can further include instructions to transmit the guarantee as a confirmation that a threshold number of occupants, including the occupant, are riding within the vehicle. The occupant analysis module 440 can further provide the guarantee including the transmission of a passport identity that is authenticated in the blockchain. The guarantee can further include providing the guarantee includes an assurance that the passenger satisfies one or more standards for ridesharing. Thus, the occupant analysis module 440 can provide a further benefit of providing a level of reliable assuredness with the occupant identity, thus allowing verified occupants to more comfortably travel in secured areas, such as border regions.

The occupant analysis module 440 can include instructions to transmit the information and data through a network or otherwise make the data available to end users. In some implementations, the occupant analysis module 440 can transmit the associated blocks to a plurality of occupant responsive devices, where the occupant responsive devices are part of the network. In some examples such as during law enforcement or regulation, the occupant responsive device can be in the control or possession of a law enforcement officer. In further examples, the occupant analysis module 440 can distribute the blocks of the blockchain ledger to a secondary source, such as the server 272. Through the server, end users or devices not part of the network can access the accumulated occupant identity information and vehicle identity information. As such, the occupant analysis module 440 can present, provide, or otherwise make available, the blockchain ledger or components thereof to devices or end users either inside or outside of the network. Thus, the occupant verification system 260 can provide verified information about occupants to prevent unauthorized use of HOV lanes, prevent unauthorized border crossings, collect tolls based on occupancy, and others.

In one or more further implementations, the occupant analysis module 440 can receive or produce control instructions related to the response from the occupant responsive device. The control instructions, as used herein, can include one or more inputs or indications to control the vehicle and/or the occupants in response to the blockchain occupancy ledger. The control instructions from the occupant analysis module 440 can be related to occupant identifiers and/or the one or more occupant profile elements. In some implementations, the occupant analysis module 440 can present control instructions to the vehicle with permission to proceed, such as based on verified occupant identities, as stored in the blockchain ledger. In further implementations, the occupant analysis module 440 can present control instructions which provide for or transmit a fine, such as for violation of a HOV lane based on the vehicle having only one occupant. In yet further implementations, the occupant analysis module 440 can apply the control instructions to control aspects of the vehicle, such as through one or more autonomous driving modules 250 of the vehicle 200.

It is understood that occupant verification and authentication can be insufficient for one or more purposes. The known level of information related to the occupant can be compared against a threshold of sufficiency, such that the occupant is trusted by the recipient (e.g., other occupants or law enforcement officers). As such, the occupant analysis module 440 can present control instructions in response to or in furtherance of an approval threshold, in one or more implementations. An approval threshold is a threshold can be established by occupant verification system 260 and/or an end user to indicate one or more verification parameters or characteristics related to interaction with the vehicle and/or another occupant according to desired behavior. In one or more implementations, the approval threshold can be expressed verbally (e.g., at least height, weight, eye color, and home address must be known before the approval threshold is met) or numerically (e.g., 7 of 24 parameters must be known before approval threshold is met). In further implementations, the approval threshold can be related to percentiles of confirmation, such as a level of assuredness that known information is correct. In some implementations, once the approval threshold is met, control instructions can be forwarded such that the vehicle is allowed to proceed, is not fined, is given the proper toll, or others as appropriate. In further implementations when the approval threshold is not met, the occupant analysis module 440 can forward or present the control instructions such that the occupant verification system 260 requests further information about the occupant, the occupant is rejected, the vehicle is rejected, or the inadequateness of the approval threshold is otherwise addressed. Thus, the occupant verification system 260 can provide for a level of control in the verification process and allow for occupant response to negative determinations.

In yet further embodiments, the occupant profile elements include one or more detected behavioral indicators. Detected behavioral indicators, as used herein, can include anticipated or expected behavioral characteristics, as determined from the occupant profile elements. The detected behavioral characteristics can include tendencies toward violence or other indicators toward safety or trustworthiness. The detected behavioral indicators can relate to psychological aspects about the occupant. In one or more implementations, the detected behavioral indicators can be stored as part of the trust information 470, shown in the database 410. In one or more implementations, the blockchain ledger and other related information can be stored as part of the occupancy data 480, such as in the database 410.

The occupant verification system 260 can thus provide numerous benefits to occupants and the traveling populations as a whole. The occupant verification system 260 can create the blockchain ledger which can be used to standardize information in a number of fashions, an organization of identification information in a single location, which is both verified and widely available. The occupant verification system 260 can further include occupant identifiers, occupant profile elements, historical vehicle interactions, ratings from other users or occupants, or others which assist both in reducing the necessity of police patrolling of highways and increases safety for occupants in the vehicles, as described above.

Figure 5:
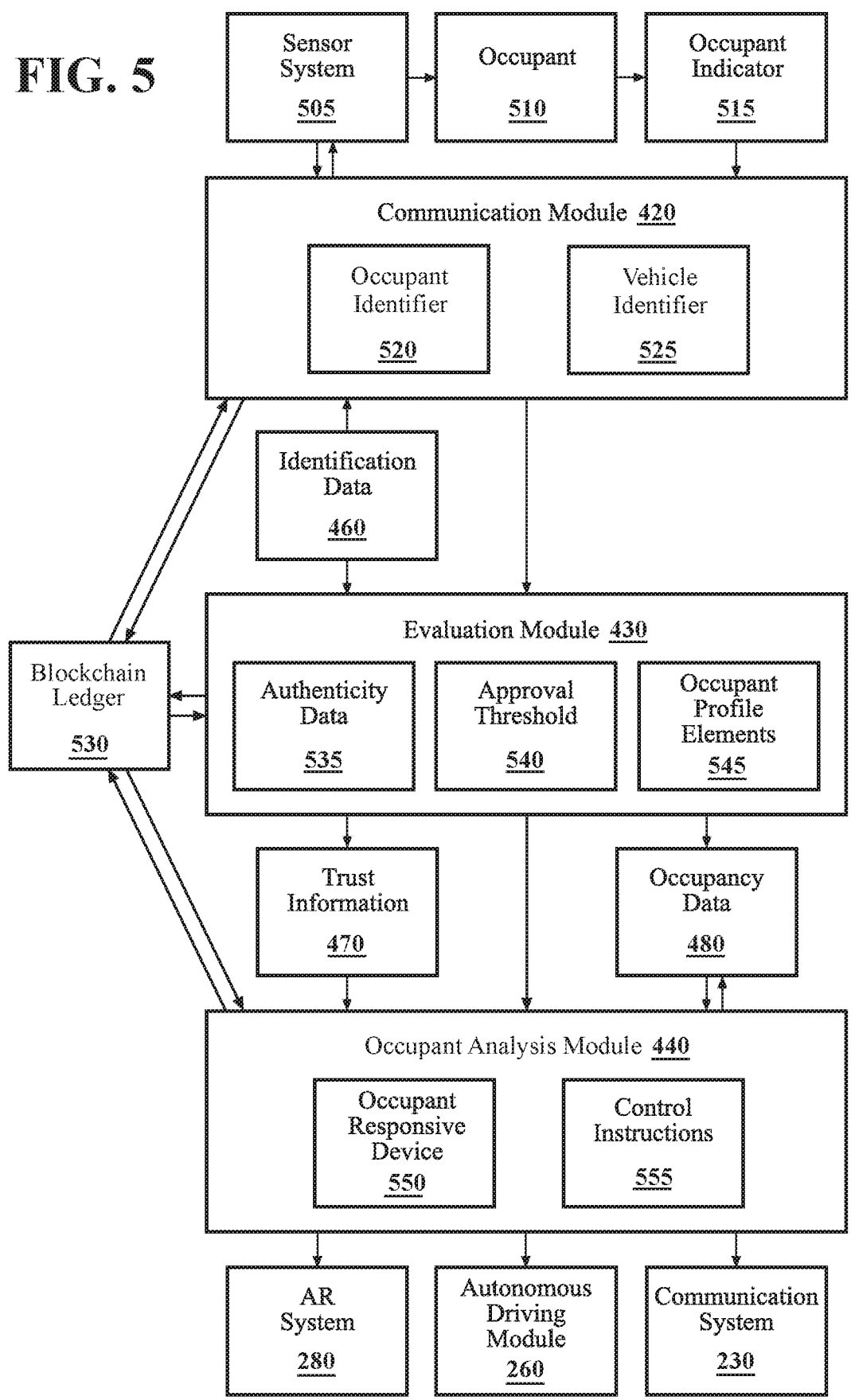
FIG. 5 is a schematic of the occupant verification system, according to one or more implementations.

FIG. 5 is a schematic of the occupant verification system 260, according to one or more implementations. The occupant verification system 260 can be configured to receive an occupant indicator, determine occupant identity and profile information, record said information into as blocks in the blockchain ledger, and distribute the blocks to a variety of locations for safety and verification purposes. By collecting occupant identifiers and occupant profile elements and subsequently comparing said identifiers to information available in the blockchain ledger, the occupant verification system 260 can verify the occupant identities and vehicle associations, prevent violations of local laws, allow for safer and quicker transit across borders, and reduce costs related to enforcement. Thus, the occupant verification system 260 can allow for more reliable and trusted interaction between occupants, and reduce the need for direct interaction with law enforcement.

The occupant verification system 260 can begin with an occupant indicator 515. The occupant indicator 515 can be provided directly by the occupant 510, by the sensor system 505 receiving information about the occupant 510, or other systems capable of determining the presence of an occupant within the vehicle. The sensor system 505 can include one or more sensors capable of detecting the occupant 510 with relation to the vehicle. In one or more implementations the sensor system 505 can be substantially similar to the sensor system 220 as embodied in the vehicle 200, described with reference to FIG. 2. The occupant 510 can be a driver, a user, passenger, or other person existing within the vehicle. The occupant indicator 515 can be data or indicia which indicate the presence of the occupant 510 in the vehicle. The communication module 420 can receive the occupant indicator 515 indicating the presence of the occupant 510.

The communication module 420 can then include instructions to collect one or more occupant identifier(s) 520 and one or more vehicle identifier(s) 525. The occupant identifier(s) 520 and the vehicle identifier(s) 525 can be substantially similar to the occupant identifiers and vehicle identifiers described with reference to FIG. 4. The occupant identifier(s) 520 can be collected directly from the occupant 510, such as by the presentation of an ID, or collected indirectly, such as through the sensor system 505 by verifying one or more data points with relation to an object recognition system. The occupant identifiers 520 can be added to the identification data 460 and stored as part of a database, such as the database 410 described with reference to FIG. 4. Further, the occupant identifier(s) 520 and the vehicle identifier(s) 525 can be added as blocks to the blockchain ledger, as described above with reference to FIG. 4. The occupant data and information, such as the occupant indicator 515, the occupant identifiers 520, and other elements stored within the identification data 460, can then be forwarded or otherwise made available by the communication module 420 to the evaluation module 430.

The evaluation module 430 can include instructions to compare the identification data 460 to the authenticity data 535. The authenticity data 535 can include data points or other objective criteria which can be used to verify the identity of the occupant 510. The communication module 402 can retrieve authenticity data 535 from the blocks stored in a blockchain ledger 530. The blockchain ledger 530 can include one or more blocks containing the authenticity data 535, such as interactions between occupants and vehicles as part of the occupant verification system 260. The evaluation module 430 can further include instructions to verify the identification data 460 with relation to an approval threshold 540. The approval threshold 540 can be a minimum data level and/or verification level for approval. The approval threshold 540 can be applied by the occupant verification system 260 in determining whether the identification data 460 is verified, rejected, or requires further information.

Once verified, data from the identification data 460, as well as the authenticity data 535 and the approval threshold 540, can then be stored as part of the occupancy data 480, described with reference to the database 410 in FIG. 4, and the blockchain ledger 530. The blockchain ledger 530 can be substantially similar to the blockchain occupancy ledger described with reference to FIG. 4. In some implementations, the occupancy data 480 is stored as part of the blockchain ledger 530. As such, the occupant verification system 260 can include instructions to incorporate the occupancy data 480 into one or more blocks. The block(s) can then receive a verification code and transmitted to devices within the network for verification, and subsequently incorporated into the blockchain ledger 530.

The evaluation module 430 can further be configured to collect one or more occupant profile elements 545. The occupant profile elements 545 can be substantially similar to the occupant profile elements described with reference to FIG. 4. The occupant profile elements 545 can be used alongside other indicia and data to make a determination about the trustworthiness of the occupant 510. As above, the occupant profile elements 545 can include criminal background, behavior or mannerisms of the occupant 510, use and/or usage pattern of drugs of abuse, other data and/or information which tend to indicate the trustworthiness of the occupant 510, or combinations thereof. The occupant profile elements 545 can then be stored as part of the trust information 470, described with reference to the database 410 in FIG. 4. The trust information 470 and the occupancy data 480 can then be forwarded by the evaluation module 430 or otherwise made available to the occupant analysis module 440.

The occupant analysis module 440 can further include the occupant profile elements 545 as part of the blockchain ledger 530. The blockchain ledger 530 can include the identity and timeframe for any verified occupants, such as the occupant 510. The blockchain ledger 530 can further include trust elements with relation to said verified occupants. The trust elements can include raw data, such as found in the occupant profile elements 545, process data such as found in the trust information 470, publicly available information as can be derived from cloud data sources or other sources of information, or others.

The occupant analysis module 440 can include instructions to make one or more determinations about the occupant 510 using the verified identity and trustworthiness of the occupant 510. Determinations can include guarantees on identity or trustworthiness, as described above with reference to FIG. 4. The occupant analysis module 440 can further create one or more control instructions 555. The control instructions 555 can be substantially similar to the control instructions described with reference to FIG. 4. The control instructions 555 can include one or more instructions and/or one or more informational components presented to a variety of sources for control of the vehicle, such as a verified occupant (e.g., the occupant 510 through the communication system 230 and/or the augmented reality (AR) system 280), one or more autonomous systems of the vehicle (e.g., the autonomous driving module(s) 250 of the vehicle 200), to a remote system which may control the vehicle (e.g., the server 272 through the network 270), or others.

In further embodiments, the occupant verification system 260 can include instructions to interact with the occupant responsive device 550. The occupant responsive device 550 can include devices or systems capable of allowing the occupant verification system 260 to interact with the occupant 510. In one or more implementations, the communication module 420 can receive or send data or information to the occupant responsive device 550, such as the occupant 510 providing the occupant indicator 515 directly to the communication module 420, the communication module 420 requesting one or more occupant identifiers 520 from the occupant 510, the communication module 420 verifying one or more occupant indicator 515 as received from the sensor system 505, or others. Thus, the occupant responsive device 550 can allow the occupant 510 to be responsive to the collection and verification needs of the communication module 420 as determined by the occupant verification system 260.

Further, the occupant responsive device 550 can communicate bidirectionally with the evaluation module 430. "Bidirectionally," as used herein, refers to the ability to send or receive data and/or information between two sources. In one or more implementations, the evaluation module 430, upon comparing the identification data 460 to the authenticity data 535 based on the information held in the approval threshold 540, can determine that more information is needed to verify the identity of the occupant 510. The evaluation module 430 can then include instructions to contact the occupant responsive device 550 to receive further information from the occupant 510 which can be applied to the verification process. The occupant 510 can then respond to this request through the occupant responsive device 550. In one example, the occupant responsive device 550 can include a card reader and/or a scanner.

In further implementations, the evaluation module 430 can ask one or more distinguishing questions intended to differentiate between occupants. The one or more distinguishing questions can be derived from information that, due to the obscurity or otherwise difficult nature of acquiring, that the occupant 510 is believed to be the only one to know. In one example, the distinguishing questions can include former addresses, former employers, first pet, or others. Thus, the occupant 510 can provide further objective and/or subjective data about their identity to the evaluation module 430 using the occupant responsive device 550.

Further, the occupant responsive device 550 can communicate bidirectionally with the occupant analysis module 440. Thus, the occupant analysis module 440 can present one or more of the occupant identifiers 520, the approval threshold 540, the blockchain ledger 530, the control instructions 555, or others which can be useful to the occupant 510. In one or more implementations, the occupant 510 can then use the control instructions 555 to communicate one or more instructions involving the operation of the vehicle, the addition of further occupants, or other modifications which may be related to the results of the occupant verification or trustworthiness, to the occupant analysis module 440. The occupant analysis module 440 can then perform one or more tasks in relation to the communication from the occupant 510 to the occupant responsive device 550, such as present or modify the control instructions 555, request further information and/or modify the blockchain ledger 530, present one or more occupant specific data points, or others.

The occupant verification system 260 can thus use one or more autonomous and/or responsive elements to gather information about and verify the identity of one or more occupants, such as the occupant 510. Thus, the occupant verification system 260 can provide numerous benefits with relation to occupant identity and trustworthiness in a vehicular environment. First, the occupant verification system 260 can allow the occupant 510 to be verified in advance such that delays can be minimized. Further, the occupant verification system 260 can provide indicators of trustworthiness such that sensitive occupants can make a determination whether a ride should be shared with another occupant or not. As well, the occupant verification system 260 can provide information in a verifiable and secure fashion, such as through the blockchain ledger 530, creating a time-based ledger the can be relied on for future transportation of ridesharing need. Finally, the occupant verification system 260 can minimize the need for and the interaction with law enforcement for the purposes of toll and HOV enforcement.

Figure 6A:
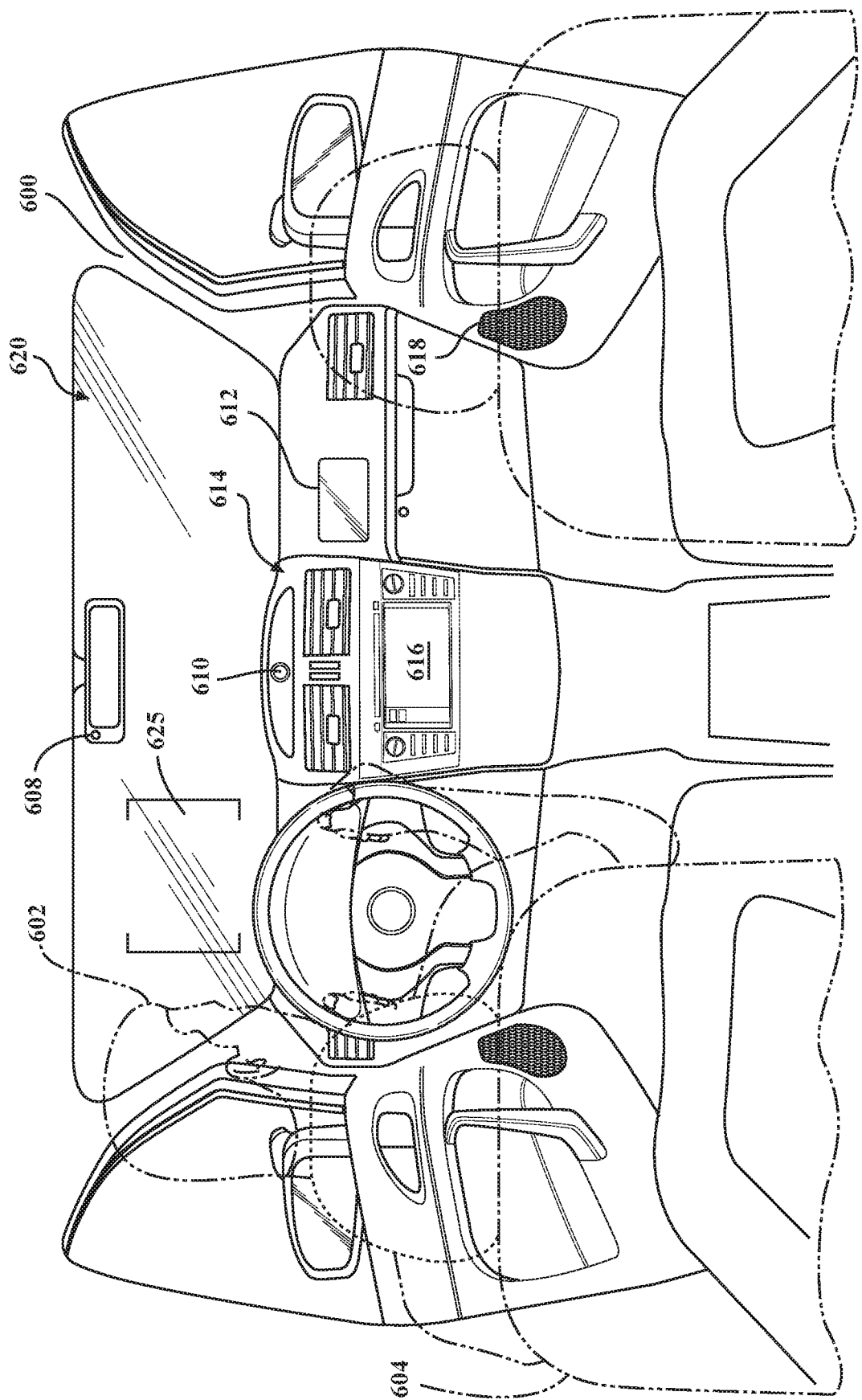
FIGS. 6A and 6B are depictions of an exemplary vehicle incorporating the occupant verification system in a vehicular environment, according to one or more implementations.
Figure 6B:
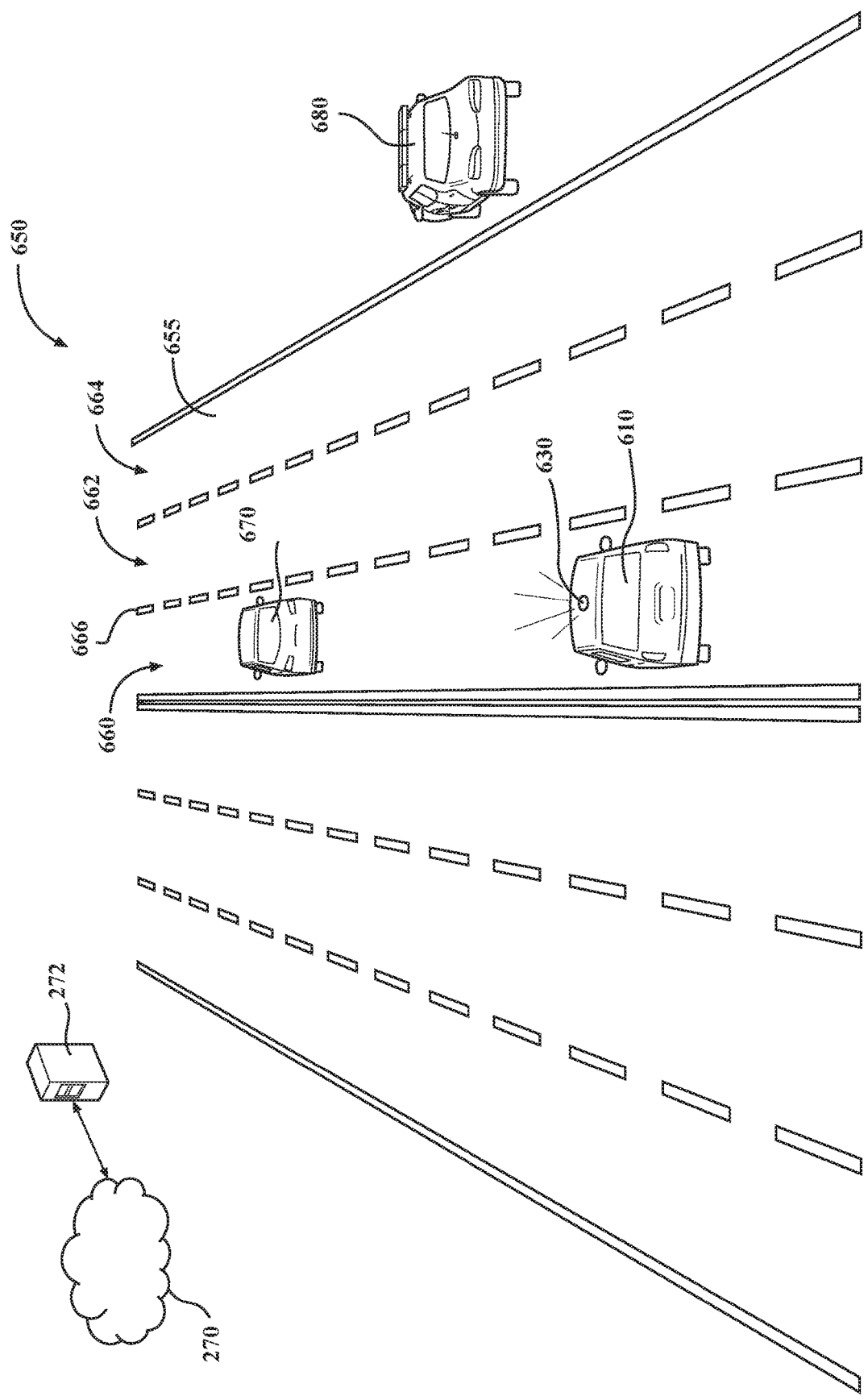

FIGS. 6A and 6B are depictions of an exemplary vehicle 600 incorporating the occupant verification system 260 as part of the vehicular environment, according to one or more implementations. FIG. 6A depicts the interior of the exemplary vehicle 600 incorporating the occupant verification system 260, according to one or more implementations. The vehicle 600 can include one or more occupants, such as an occupant 602 sitting in a driver seat 604. The occupant 602 can occupy any appropriate space within the vehicle 600 and is not limited to the driver seat 604. The occupant 602 can further include a sensor system 606. The sensor system 606 can include a variety of sensors capable of detecting information or data related to the occupant 602, such as used by the occupant verification system 260. Examples of sensors used as part of the sensor system 606 can include an image capture device 608 and an audio capture device 610. The vehicle 600 can further include an occupant responsive device 612. The image capture device 608, the audio capture device 610, and the occupant responsive device 612 can be operatively connected with a device console 614. The device console 614 can further include a console display 616. The vehicle 600 can further include a windshield 620. In some implementations, the windshield 620 can further include an AR display 625.

The occupant verification system 260 can begin with instructions to detect or receive one or more occupant indicators in the vehicle 600. In this example, the image capture device 608 in the audio capture device 610 collect one or more occupant indicators related to the occupant 602. The occupant indicators can include that the occupant 602 is recognized as a person through object recognition, speech as detected from the occupant 602 at the audio capture device 610, weight can be detected by one or more pressure sensors in the driver seat 604. In further implementations, the occupant 602 can have presented himself for identification, such as by announcing his presence to the occupant verification system 260 in the vehicle 600.

The vehicle 600, through the communication module 420 of the occupant verification system 260, can then collect the occupant identifiers. The occupant identifiers, as used here, can be substantially similar to the occupant identifiers 520, described with reference to FIG. 5. In this example, occupant identifiers can include facial recognition of the occupant 602, the interaction of the occupant 602 with the console display 616 to input an indicator (e.g., a driver's license number), and the presence of the occupant responsive device 612. In some implementations, the occupant responsive device 612 can be a portable device carried by the occupant 602. The occupant responsive device 612 can act as both an occupant indicator and for the occupant identifiers as related to the occupant 602. In further implementations, the occupant responsive device 612 can be in communication with the vehicle 600, such as to assist in alerting the occupant 602 occupant presence and occupant identity, as appropriate.

The vehicle 600, through the evaluation module 430 of the occupant verification system 260, can collect occupant identifiers and/or occupant profile elements regarding the occupant 602. The occupant identifiers and/or the occupant profile elements can be substantially similar to the occupant identifiers 520 and the occupant profile elements 545 described with reference to FIG. 5. The occupant identifiers collected here can include distinguishing characteristics which would tend to identify the occupant 602, locations which are associated with the occupant 602, verification regarding the driver's license number, the comparison between voice tone and patterns, and other identifying data points which can be compared against authenticity data. The occupant profile elements collected here can include driving behaviors and tone for the occupant 602, criminal history, interactions with law enforcement, and other elements which may indicate safety or trustworthiness. In this example, the evaluation module 430 of the occupant verification system 260 can determine that the occupant 602 has numerous driving infractions which indicate reckless driving behavior.

Once the occupant verification system 260 collects and compares the occupant identifiers against the authenticity data to the point that the approval threshold is met, the vehicle 600, through the occupant analysis module 440 of the occupant verification system 260, can then record the verification as part of the blockchain ledger. The blockchain ledger can be substantially similar to the blockchain ledger 530, described with reference to FIG. 5. The occupant verification system 260 can record the occupant identifiers, the vehicle identifiers, and related determinations as part of a block for the blockchain ledger. The occupant verification system 260 can further generate a verification code for the block, distribute the block to other devices in the network, where the block will be verified and added to the blockchain ledger as stored by the respective devices. The blockchain occupancy ledger in this example can include the occupant profile elements as well as the occupant identifiers described above for the occupant 602.

FIG. 6B depicts the vehicle 600 as part of the vehicular environment 650, according to one or more implementations. The vehicle 600 is depicted here as an autonomous vehicle including external sensors 630. In this example, the vehicle 600 is shown on a road 655. The road 655 is depicted as a highway road having three lanes, a HOV lane 660, a first lane 662, and a second lane 664, each of which being separated by road markings 666. The vehicle 600 and a second vehicle 670 are commuting in the HOV lane 660. Further, in this example, a law enforcement vehicle 680 is located at the side of the road 655. The second vehicle 670 can be a manual (non-autonomous) vehicle which also incorporates the occupant verification system 260 as described above with reference to FIGS. 4 and 5. The law enforcement vehicle 680 can be a member of local law enforcement charged with enforcement of HOV laws on the road 655.

Here the occupant 602 has been verified by the occupant verification system 260 and only one occupant is detected and recorded in the blockchain occupancy ledger. The occupant analysis module 440 of the occupant verification system 260 can then, through the network 270, forward the verified occupant identities and vehicle identities, as collected for the vehicle 600 and the second vehicle 670, to the server 272 and the law enforcement vehicle 680. In one or more implementations, the occupant verification system 260 of the vehicle 600 and the second vehicle 670 each produce blocks for the blockchain ledger. The blockchain ledger can be separate ledgers between the vehicle 600 and the second vehicle 670 or the same ledger, as desired. In this example, the blockchain occupancy ledger is a separate ledger for each of the vehicle 600 and the second vehicle 670. The block produced by the occupant verification system 260 for the vehicle 600 includes a verified identity for a single occupant, the occupant 602. The block produced by the occupant verification system 260 for the second vehicle 670 includes two (2) verified identities and one (1) unverified identity for a total of three (3) occupants. The respective blocks for the blockchain ledgers can further include vehicle identifiers for the vehicle 600 and the second vehicle 670, including specific numbers, GPS location, vehicle route, and trajectory, operating information about the vehicle 600 and the second vehicle 670, as well as other information which can be found relevant to the vehicle occupancy and/or use.

The occupant verification system 260, through the law enforcement vehicle 680, can then use the above-described information, as stored in the blocks of the blockchain ledger, to determine that the vehicle 600 is violating the HOV lane rules. As well, the occupant verification system 260 can use the information and data stored in the blockchain ledger to determine that the second vehicle 670 is within the requirements of the rules of the HOV lane 660. Though the identity of the third occupant could not be verified in this example, the occupant verification system 260 can be relied on to provide general indicators even when the identity cannot be verified. In some examples, the occupant verification system 260 can further provide a guarantee regarding the third occupant, such that the law enforcement officer can rely on the received data. Here the law enforcement vehicle 680 has relied on the verified total of three (3) occupants in the second vehicle 670 to conclude that the rules of the HOV lane 660 were not violated. The law enforcement vehicle 680 can then act accordingly with regards to the vehicle 600, including pulling the vehicle 600 over an offering a citation, sending instructions to the occupant verification system 260 of the vehicle 600 to indicate either a citation or that the vehicle 600 should pull over, or others.

In some implementations, the occupant verification system 260, as implemented from or interacting with the law enforcement vehicle 680, can send control instructions to the vehicle 600 such that control of the vehicle 600 is transferred to the law enforcement vehicle 680 for the purposes of law enforcement. Here, the occupant verification system 260 can send a set of control instructions to the autonomous driving module(s) 250 of the vehicle 600, such as through the occupant analysis module 440 of the occupant verification system 260. The control instructions can include directing the autonomous driving module(s) 250 to determine and follow a quick and safe route to the side of the road 655.

In further implementations, the vehicle 600, through the occupant analysis module 440 of the occupant verification system 260, can provide guidance to other occupants or other vehicles on the road 655. In this example, occupant profile elements as recorded in the blockchain ledger can indicate that the vehicle 600 has the potential to be an unsafe driver. As such, in a ridesharing situation, the occupant verification system 260 can instruct other potential occupants that this ridesharing vehicle (e.g., vehicle 600) may be unsafe, should the occupant 602 have to take manual control of the vehicle 600. Further, the vehicle 600, through the occupant analysis module 440 of the occupant verification system 260, can provide guidance or instructions to the second vehicle 670 regarding the same described behaviors of the occupant 602. The occupant verification system 260 can further record all of the above determinations as part of a block for the blockchain ledger, such as to assure that said information and data is incorporated in further decision-making for this or other implementations of the occupant verification system 260

In further implementations, the occupant verification system 260 can include instructions to act preemptively to prevent the vehicle 600 from breaking the law. In this example, the occupant verification system 260 can further access laws or regulations related to the vehicle 600 as interacting with the road 655. After determining that the vehicle 600 was in the HOV lane 660 without having the necessary number of occupants, the occupant verification system 260 can provide information and/or one or more control instructions with relation to the laws or regulations, as appropriate. In some examples, the occupant verification system 260 can present guidance to the occupant 602 in the vehicle 600, such as through the console display 616, speakers 618, and/or AR display 625. In further examples, the occupant verification system 260 can provide control instructions to the autonomous driving module(s) 250 of the vehicle 600, thus moving the vehicle 600 out of the HOV lane 660 and into either the first lane 662 or the second lane 664.

Thus, the occupant verification system 260 can help guide the vehicle 600 and the second vehicle 670 and provide advance information to external systems, such as the law enforcement vehicle 680. The occupant verification system 260 can provide numerous benefits to one or more vehicles in a vehicular environment. As shown here, the occupant verification system 260 can help prevent one or more vehicles from breaking the law. Further, occupant verification system 260 can help reduce costs on law enforcement by minimizing costly checks. Further, as the occupant verification system 260 uses a blockchain, the occupancy ledger is not subject to alteration, thus allowing the law enforcement vehicle 680 to rely on the information received. Finally, the occupant verification system 260 can help increase safety on the road 655 by keeping occupants, such as the occupant 602, informed about potential driver behavior.

Figure 7:
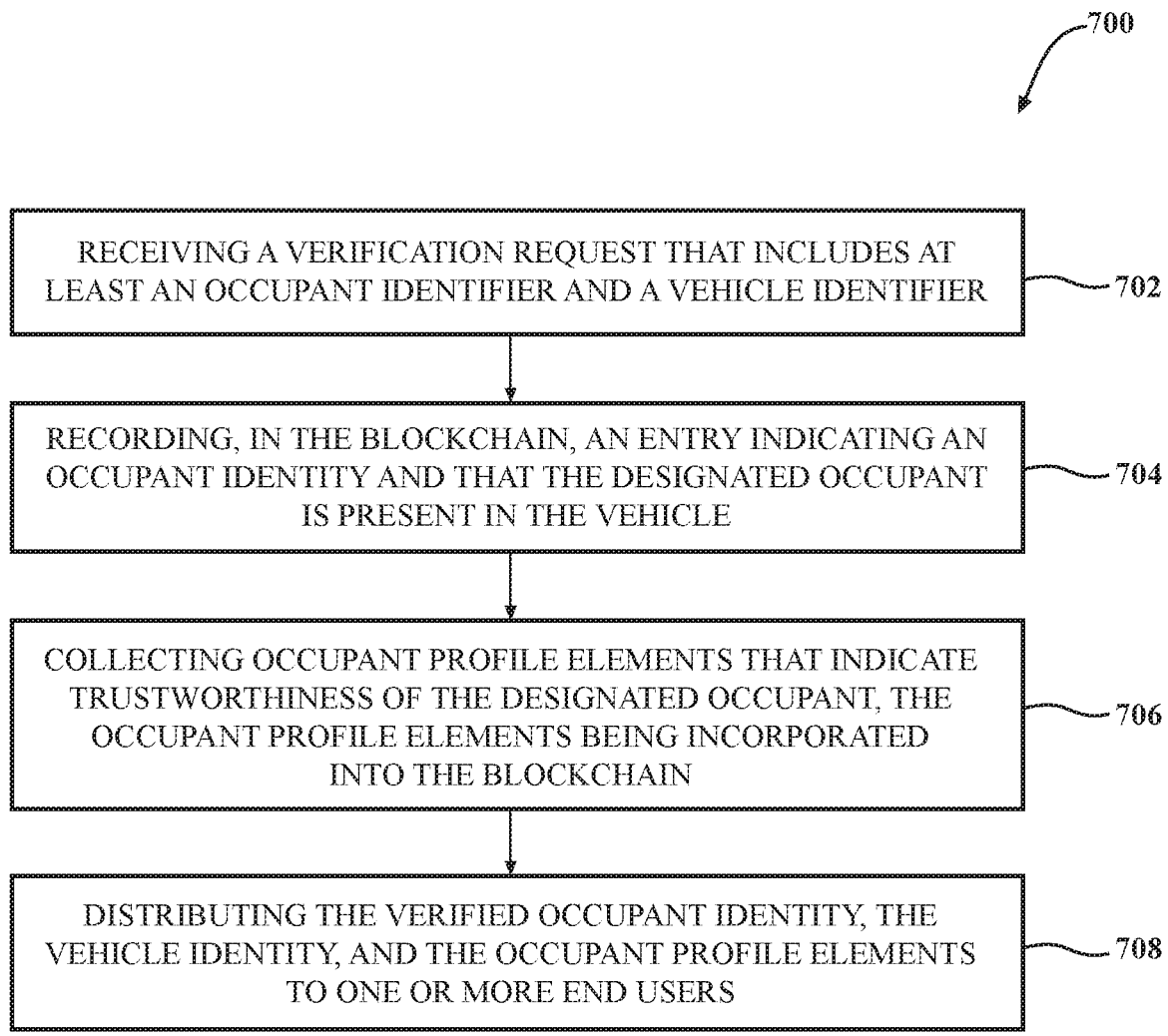
FIG. 7 is a flow diagram of a method for occupant authentication and trust, according to one or more implementations.

FIG. 7 is a flow diagram of a method 700 for occupant authentication and trust, according to one or more implementations. The method 700 can include verifying and authenticating occupant identity and occupant trustworthiness. The occupants can then be added to a blockchain occupancy ledger so that the information can be reliably distributed. Thus, the method 700 provides a variety of benefits for timing and access to sensitive data regarding vehicle occupancy. The method 700 can include receiving, from a vehicle, a verification request that includes at least an occupant indicator that uniquely identifies the designated occupant and a vehicle identifier that uniquely identifies the vehicle, at 702. Then, in response to verifying, in a blockchain, that the occupant indicator and the vehicle indicator correspond with identifying information for the designated occupant and the vehicle, an entry can be recorded in a blockchain indicating the occupant identity and that the designated occupant is present in the vehicle, at 704. Then, using the verified occupant identity, one or more occupant profile elements can be collected that indicate trustworthiness of the designated occupant, at 706. Then, the verified occupant identity, the vehicle identity, and the occupant profile elements can be distributed to one or more end users, at 708.

The method 700 can begin with receiving, from a vehicle, a verification request that includes at least an occupant indicator that uniquely identifies the designated occupant and a vehicle identifier that uniquely identifies the vehicle, at 702. A verification request as used herein can generally relate to any indication an occupant exists within the vehicle. The verification request can be substantially similar to the verification requests, described with reference to FIGS. 4 and 5. The verification requests can be determined based on one or more indicia of an occupant's presence in the vehicle, such as visual-based detection, biometrics, receipt of wireless signal, object recognition, or others. Further, the verification request can be received by the method 700 based on one or more occupant(s) entering, existing within, or exiting the vehicle. In one or more further implementations, the verification request for the occupant can occur immediately upon the occupant entering the detectable range, immediately upon crossing a certain threshold, or after a period of time. In one or more further implementations, the verification request can be initiated by a combination of indicators or events and can include the actuation of, or interaction with, a vehicle component.

The method can further include detecting one or more occupant identifiers and one or more vehicle identifiers. The one or more occupant identifiers, as used herein, are facts, features, indicia, associations, or others which tend to indicate or are determinative of the identity of the occupant. The one or more vehicle identifiers are codes or descriptors which can be used to identify the vehicle uniquely. The occupant identifiers and the vehicle identifiers can be substantially similar to the occupant identifiers and the vehicle identifiers, described with reference to FIGS. 4 and 5. In one or more implementations, the occupant identifiers can include facial features or recognition data, prior vehicle interaction, data as derived from a government-issued identification (ID), law enforcement reports or other government interactions, self-reported information (e.g., an occupant reporting a name and address), data from associated devices (e.g., a cell phone), or others. The occupant identifiers can be received, selected, and/or concatenated based on the level of identification desired and/or required for the intended purpose and/or intended recipient. The occupant identifiers can include a high-level verification and/or a low-level verification, where the level of verification can reflect the occupant criteria for authentication (e.g., minimum number of occupants, specific identity of an occupant, etc.).

In further examples of low-level or high-level verification, object recognition can be applied to the one or more occupants. In one or more implementations, object recognition can include facial recognition. Object recognition as used for the method 700 can be substantially similar to object recognition, described above with reference to FIG. 4. The method 700 can apply object recognition, such as general determinations based on object models, facial recognition, and others, in creating the occupant identifiers, verifying the object identity elements, or others as desired.

In one or more embodiments, the receiving of the occupant indicator, the occupant identifiers, and the vehicle identifiers can be included as part of a system, such as the occupant verification system 260 described with reference to FIG. 4. The occupant verification system 260 can include the communication module 420. The communication module 420 can generally include instructions that function to control the processor 304 to receive an occupant indicator and one or more occupant identifiers for an occupant in a vehicle. In one or more embodiments, the occupant verification system 260 receives or collects one or more occupant indicators and one or more occupant identifiers using a sensor system 220. The communication module 420 can further include instructions to collect occupant identifiers or related data for further verification and/or object recognition systems. The occupant indicator and/or the one or more occupant identifiers can then be stored as part of the identification data 460, as shown here in the database 410.

The occupant identifier and the vehicle identifiers can then be compared against the identifying information as available from the blockchain ledger using the method 700. The method 700 can include referencing data stored about an occupant or a vehicle from one or more blocks. The blocks can include historical interactions or other data related to the occupant or the vehicle. The occupant identifier and the vehicle identifier can thus be authenticated using the historical information available from the blockchain. The occupant identifiers, as described above, can then be compared to known information or indicia (e.g., authenticity data) to corroborate the occupant identifiers as presented. In some implementations, the data of the occupant identifiers, as well as metadata about the occupant identifiers (e.g., specific placement of the numbers or pictures, anti-tampering devices, micro print, or others), can be verified against known or trusted data in secondary sources. The occupant identifiers and/or components thereof can be compared to known local or remote authenticity data to verify the occupant identifiers. In further implementations, verification of the occupant identifiers or portions thereof can authenticate the occupant. Authenticity data can be any data available to the method 700 such that the occupant identifiers can be verified, such as government databases, prior ride history, anti-fraud elements, collected biometrics, known patterns, or other data which can be used to independently verify the one or more occupant identifiers and make an authenticity determination. Authenticity data used by the method 700 need not be directly related to the occupant identifiers.

In one or more embodiments, the verification of the occupant identifiers can be included as part of a system, such as the occupant verification system 260 described with reference to FIG. 4. The occupant verification system 260 can include the evaluation module 430. The evaluation module 430 can generally include instructions that function to control the processor 304 to verify one or more occupant identifiers in response to the occupancy indicator. In one or more embodiments, the occupant verification system 260 can compare the one or more occupant identifiers to authenticity data to verify or reject the occupant identifiers. Verification of the occupant identifiers or portions thereof can be used by the evaluation module 430 to authenticate the occupant. Authenticity data can be any data available to the evaluation module 430 such that the occupant identifiers can be verified. The authenticity data, as well as verified portions of the occupant identifiers, can be stored as part of the occupancy data 480, as shown in the database 410.

Then, in response to verifying, in a blockchain, that the occupant indicator(s) and the vehicle indicator(s) correspond with identifying information for the designated occupant and the vehicle, an entry can be recorded in a blockchain indicating the occupant identity and that the designated occupant is present in the vehicle, at 704. The method 700 can include producing a block for the blockchain ledger. The blockchain ledger can be a file storage system formed from one or more blocks and one or more verification codes related to those blocks. In one or more implementations, the blockchain ledger can include elements about occupants as related to the vehicle, such as verification of occupant identifiers, authentication of occupants, number and location of occupants in the vehicle, and other elements which inform about the relationship between the occupants and the vehicle. The block can include the above-described data including the occupant indicator(s), the vehicle indicator(s), the identifying information used, and any secondary information applied in the verification. The method 700 can further include producing a verification code for the block and distributing the block to other devices on the network. The devices can verify the block using the verification code and incorporate the block into the blockchain ledger for further use.

Then, using the verified occupant identity, one or more occupant profile elements can be collected that indicate the trustworthiness of the designated occupant, at 706. Occupant profile elements, as used herein, relates to data, information, behaviors, mannerisms, or other details which speak to trustworthiness or safety in relation to the occupant. The occupant profile elements, as discussed here, can be substantially similar to the occupant profile elements described with reference to FIGS. 4 and 5. The method 700 can thus determine profile elements about the occupants. The occupant profile elements can indicate to one occupant that another occupant is safe or otherwise trustworthy. In further embodiments, occupant profile elements may be selected to satiate known bias or concerns, regardless if the occupant profile element is otherwise innocuous, some examples of which are offered with reference to FIGS. 4 and 5. Occupant profile elements can include criminal history, personality, behavior, known associations, or other factors which can be used to evaluate the occupant. In one or more implementations, the occupant profile elements can then be reviewed or compared against known information or indications to determine if there is a match between the occupants.

In one or more embodiments, the collection of the occupant profile elements can be included as part of a system, such as the occupant verification system 260 described with reference to FIG. 4. The occupant verification system 260 can include the evaluation module 430. The evaluation module 430 can further include instructions to collect one or more occupant profile elements for the occupant. The occupant profile elements can be collected using the sensor system 220, the network 270 such as stored on the server 272, or others available to the evaluation module 430. The one or more occupant profile elements can then be stored as part of the trust information 470, as shown here in the database 410.

Then, at least one of the one or more occupant profile elements can be recorded in a blockchain ledger. The blockchain ledger can be substantially similar to the blockchain ledger, described with reference to FIG. 4. The method 700 can incorporate the occupant profile elements into a block. The method 700 can further include generating a verification code which incorporates data from both the new block and one or more existing blocks in the blockchain ledger. The method 700 can then include forwarding the block to one or more devices in the network, where the block will be verified and stored as part of the blockchain.

In one or more embodiments, the recording of occupant identifiers and occupant profile elements can be included as part of a system, such as the occupant verification system 260 described with reference to FIG. 4. The occupant verification system 260 can include the occupant analysis module 440. The occupant analysis module 440 can generally include instructions that function to control the processor 304 to record at least one of the one or more occupant identifiers and at least one of the one or more occupant profile elements in a blockchain ledger. In one or more embodiments, the blocks can then be forwarded through the network 270 to one or more recipient devices for occupancy determinations, for incorporation into the blockchain ledger as desired. The blockchain occupancy ledger can then be stored as part of the database 410, as described above with reference to FIG. 4.

Then, the verified occupant identity, the vehicle identity, and the occupant profile elements can be distributed to one or more end users, at 708. The method 700 can further include communicating the block of the blockchain ledger, or information recorded therein, to an occupant responsive device. The occupant responsive device can be any device which is capable of receiving and/or presenting the blockchain occupancy ledger or components thereof. The occupant responsive device can be a component of the device or system, where the device or system need not be dedicated to the function of the occupant responsive device. In some implementations, the method 700 can include transmitting the blocks or the information to a plurality of occupant responsive devices. In some examples such as during law enforcement or regulation, the occupant responsive device can be in the control or possession of a law enforcement officer. As such, the occupant responsive device can present, provide, or otherwise make available, the information or data from the blockchain ledger or components thereof to prevent unauthorized use of HOV lanes, prevent unauthorized border crossings, collect tolls based on occupancy, and others.

In one or more further implementations, the method 700 can receive or produce control instructions related to the response from the occupant responsive device, including one or more inputs or indications to control the vehicle and/or the occupants in response to the blockchain ledger. The control instructions can be related to occupant identifiers and/or the one or more occupant profile elements. In some implementations, the control instructions can include instructions to the vehicle with permission to proceed, such as based on verified identities in the blockchain occupancy ledger. In further implementations, the control instructions can provide or transmit a fine, such as for violation of a HOV lane based on the vehicle having only one occupant.

In further implementations, control instructions from the method 700 can be in response to or in furtherance of an approval threshold, in one or more implementations. The approval threshold can be substantially similar to the approval threshold described with reference to FIG. 4. In one or more implementations, the approval threshold can be expressed verbally or numerically. In further implementations, the approval threshold can be related to percentiles of confirmation, such as a level of assuredness that known information is correct. In some implementations, once the approval threshold is met, control instructions can be forwarded such that the vehicle and/or occupant is allowed to proceed, is not fined, is given the proper toll, or others as appropriate. In further implementations when the approval threshold is not met, the control instructions can be forwarded such that the method 700 requests further information about the occupant, the occupant is rejected, the vehicle is rejected, or the approval threshold is otherwise addressed.

The method 700 can incorporate occupant information and data using blockchain technology for immutable storage of occupant data and interactions, tracking movement and behaviors of occupants with vehicles and other occupants, and verifiably identifying occupants. Thus, the method 700 can provide trustworthiness information about an occupant which increases occupant safety. Further, the method 700 can verifiably identify an occupant which reduces costs associated with HOV and toll road monitoring. Further, the method 700 can make travel in restricted areas easier by providing identification in a distributed fashion.

FIG. 2 will now be discussed in full detail as an example vehicle environment within which the system and methods disclosed herein may operate. In some instances, the vehicle 200 is configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 200 can be an autonomous vehicle. As used herein, "autonomous vehicle" refers to a vehicle that operates in an autonomous mode. "Autonomous mode" refers to navigating and/or maneuvering the vehicle 200 along a travel route using one or more computing devices to control the vehicle 200 with minimal or no input from a human driver/operator. In one implementation, the vehicle 200 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 200 along a travel route. Thus, in one or more implementations, the vehicle 200 operates autonomously according to a particular defined level of autonomy. For example, the vehicle 200 can operate according to the Society of Automotive Engineers (SAE) automated vehicle classifications 0-5.

The vehicle 200 can include one or more processors 210. In one or more arrangements, the processor(s) 210 can be a main processor of the vehicle 200. For instance, the processor(s) 210 can be an electronic control unit (ECU). The vehicle 200 can include one or more data stores 215 for storing one or more types of data. The data store 215 can include volatile and/or non-volatile memory. Examples of suitable data stores 215 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store 215 can be a component of the processor(s) 210, or the data store 215 can be operably connected to the processor(s) 210 for use thereby. The term "operably connected," as used throughout this description, can include direct or indirect connections, including connections without direct physical contact.

In one or more arrangements, the one or more data stores 215 can include map data 216. The map data 216 can include maps of one or more geographic areas. In some instances, the map data 216 can include information or data on roads, traffic control devices, road markings, structures, features, and/or landmarks in the one or more geographic areas. In one or more arrangement, the map data 216 can include one or more terrain maps 217. The terrain map(s) 217 can include information about the ground, terrain, roads, surfaces, and/or other features of one or more geographic areas. In one or more arrangement, the map data 216 can include one or more static obstacle maps 218. The static obstacle map(s) 218 can include information about one or more static obstacles located within one or more geographic areas.

The one or more data stores 215 can include sensor data 219. In this context, "sensor data" means any information about the sensors that the vehicle 200 is equipped with, including the capabilities and other information about such sensors. As will be explained below, the vehicle 200 can include the sensor system 220. The sensor data 219 can relate to one or more sensors of the sensor system 220. As an example, in one or more arrangements, the sensor data 219 can include information on one or more LIDAR sensors 224 of the sensor system 220.

As noted above, the vehicle 200 can include the sensor system 220. The sensor system 220 can include one or more sensors. "Sensor" means any device, component and/or system that can detect, and/or sense something. The one or more sensors can be configured to detect, and/or sense in real-time. In arrangements in which the sensor system 220 includes a plurality of sensors, the sensors can function independently from each other. Alternatively, two or more of the sensors can work in combination with each other. In such a case, the two or more sensors can form a sensor network. The sensor system 220 and/or the one or more sensors can be operably connected to the processor(s) 210, the data store(s) 215, and/or another element of the vehicle 200 (including any of the elements shown in FIG. 2). The sensor system 220 can acquire data of at least a portion of the external environment of the vehicle 200 (e.g., nearby vehicles).

The sensor system 220 can include any suitable type of sensor. Various examples of different types of sensors will be described herein. However, it will be understood that the implementations are not limited to the particular sensors described. The sensor system 220 can include one or more vehicle sensors 221. The vehicle sensor(s) 221 can detect, determine, and/or sense information about the vehicle 200 itself. In one or more arrangements, the vehicle sensor(s) 221 can be configured to detect, and/or sense position and orientation changes of the vehicle 200, such as, for example, based on inertial acceleration. In one or more arrangements, the vehicle sensor(s) 221 can include one or more accelerometers, one or more gyroscopes, an inertial measurement unit (IMU), a dead-reckoning system, a global navigation satellite system (GNSS), a global positioning system (GPS), a navigation system 247, and/or other suitable sensors. The vehicle sensor(s) 221 can be configured to detect, and/or sense one or more characteristics of the vehicle 200. In one or more arrangements, the vehicle sensor(s) 221 can include a speedometer to determine a current speed of the vehicle 200.

Alternatively, or in addition, the sensor system 220 can include one or more environment sensors 222 configured to acquire, and/or sense driving environment data. "Driving environment data" includes any data or information about the external environment in which an autonomous vehicle is located or one or more portions thereof. For example, the one or more environment sensors 222 can be configured to detect, quantify and/or sense obstacles in at least a portion of the external environment of the vehicle 200 and/or information/data about such obstacles. The one or more environment sensors 222 can be configured to detect, measure, quantify and/or sense other things in the external environment of the vehicle 200, such as, for example, lane markers, signs, traffic lights, traffic signs, lane lines, crosswalks, curbs proximate the vehicle 200, off-road objects, etc.

Various examples of sensors of the sensor system 220 will be described herein. The example sensors may be part of the one or more environment sensors 222 and/or the one or more vehicle sensors 221. Moreover, the sensor system 220 can include operator sensors that function to track or otherwise monitor aspects related to the driver/operator of the vehicle 200. However, it will be understood that the implementations are not limited to the particular sensors described. As an example, in one or more arrangements, the sensor system 220 can include one or more radar sensors 223, one or more LIDAR sensors 224, one or more sonar sensors 225, and/or one or more cameras 226.

The vehicle 200 can further include a communication system 230. The communication system 230 can include one or more components configured to facilitate communication between the vehicle 200 and one or more communication sources. Communication sources, as used herein, refers to people or devices with which the vehicle 200 can communicate with, such as external networks, computing devices, operator or occupants of the vehicle 200, or others. As part of the communication system 230, the vehicle 200 can include an input system 231. An "input system" includes any device, component, system, element or arrangement or groups thereof that enable information/data to be entered into a machine. In one or more examples, the input system 231 can receive an input from a vehicle occupant (e.g., a driver or a passenger). The vehicle 200 can include an output system 232. An "output system" includes any device, component, or arrangement or groups thereof that enable information/data to be presented to the one or more communication sources (e.g., a person, a vehicle passenger, etc.). The communication system 230 can further include specific elements which are part of or can interact with the input system 231 or the output system 232, such as a display device 233, and one or more audio devices 234 (e.g., speakers and microphones).

The vehicle 200 can include one or more vehicle systems 240. Various examples of the one or more vehicle systems 240 are shown in FIG. 2. However, the vehicle 200 can include more, fewer, or different vehicle systems. It should be appreciated that although particular vehicle systems are separately defined, each or any of the systems or portions thereof may be otherwise combined or segregated via hardware and/or software within the vehicle 200. The vehicle 200 can include a propulsion system 241, a braking system 242, a steering system 243, throttle system 244, a transmission system 245, a signaling system 246, and/or a navigation system 247. Each of these systems can include one or more devices, components, and/or combinations thereof, now known or later developed.

The processor(s) 210 and/or the autonomous driving module(s) 250 can be operably connected to communicate with the various vehicle systems 240 and/or individual components thereof. For example, returning to FIG. 2, the processor(s) 210 and/or the autonomous driving module(s) 250 can be in communication to send and/or receive information from the various vehicle systems 240 to control the movement, speed, maneuvering, heading, direction, etc. of the vehicle 200. The processor(s) 210, the occupant verification system 370, and/or the autonomous driving module(s) 250 may control some or all of these vehicle systems 240 and, thus, may be partially or fully autonomous.

The vehicle 200 can include one or more modules, at least some of which are described herein. The modules can be implemented as computer-readable program code that, when executed by a processor 210, implement one or more of the various processes described herein. The processor 210 can be a device, such as a CPU, which is capable of receiving and executing one or more threads of instructions for the purpose of performing a task. One or more of the modules can be a component of the processor(s) 210, or one or more of the modules can be executed on and/or distributed among other processing systems to which the processor(s) 210 is operably connected. The modules can include instructions (e.g., program logic) executable by one or more processor(s) 210. Alternatively, or in addition, one or more data store 215 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 200 can include one or more autonomous driving module(s) 250. The autonomous driving module(s) 250 can be configured to receive data from the sensor system 220 and/or any other type of system capable of capturing information relating to the vehicle 200 and/or the external environment of the vehicle 200. In one or more arrangements, the autonomous driving module(s) 250 can use such data to generate one or more driving scene models. The autonomous driving module(s) 250 can determine the position and velocity of the vehicle 200. The autonomous driving module(s) 250 can determine the location of obstacles, or other environmental features including traffic signs, trees, shrubs, neighboring vehicles, pedestrians, etc.

The vehicle 200 can further include an AR system 280. It should be appreciated that the AR system 280 can take many different forms but in general functions to augment or otherwise supplement viewing of objects within a real-world environment surrounding the vehicle. That is, for example, the AR system 280 can overlay graphics using one or more AR displays in order to provide for an appearance that the graphics are integrated with the real-world through, for example, the windshield of the vehicle 200. Thus, the AR system 280 can include displays integrated with the windshield, side windows, rear windows, mirrors and other aspects of the vehicle 200. In further aspects, the AR system 280 can include head-mounted displays such as goggles or glasses. In either case, the AR system 280 functions to render graphical elements that are in addition to objects in the real world, modifications of objects in the real world, and/or a combination of the two. In one implementation, at least one AR display of the AR system 280 fuses a real-time image from a camera (e.g., exterior facing camera) of at least part of the surroundings of the vehicle 200 with synthetic objects (e.g., rendered graphical elements) from the AR system 280 and/or the occupant verification system 260. As one example, a monitor (i.e., AR display) is integrated within or just above a dashboard of the vehicle 200 and is controlled to display a fused view of graphical elements rendered by the AR system 280 with real-world images from the camera. In this way, the AR system 280 can augment or otherwise modify a view of an operator/passenger in order to provide an enriched/embellished visual sensory experience.

Referring to FIG. 3, an example of a computing device 300 having the occupant verification system 260 is illustrated. The computing device 300 can be any appropriate type of computing device such as, but not limited to, a server, a personal computer (PC), workstation, embedded computer, or stand-alone device with a computational unit, such as a microprocessor, DSP (digital signal processor), FPGA (field programmable gate array), or ASIC (application-specific integrated circuit). Shown here, the computing device 300 is a server connected with a display device 320. While arrangements will be described herein with respect to servers, it will be understood that implementations are not limited to servers. In some implementations, the computing device 300 can be any other form of computing device that, for example, can receive data transmissions from one or more vehicles, send data transmissions to one or more vehicles, and can benefit from the functionality of the occupant verification system discussed herein.

The computing device 300 can have an input 302. The input 302 can be configured to send or receive information, such as in an electronic format. In one or more examples, the input 302 can be configured to obtain environmental information, obtain vehicular information, and/or for communication with other computing devices. The input 302 can include one or more connections, either wired or wireless, for use as an input device to the computing device 300. An input device can include any device capable of providing input to a computer in any fashion, including through the use of an intermediate device. The input 302 can be any suitable communication interface, which can be dependent on device type. Examples of interfaces for the input 302 can include, but are not limited to, USB (universal serial bus), Lightning, frame grabber, Ethernet, or Firewire.

The computing device 300 can further include one or more processor(s) 304, such as a general purpose processor, for use in the data processing and analysis described herein. The processor 304, which can also be referred to as a central processing unit (CPU), can be a device which is capable of receiving and executing one or more instructions to perform a task as part of a computing device. In one implementation, the processor(s) 304 can include a microprocessor such as an application-specific instruction set processor (ASIP), a graphics processing unit (GPU), a physics processing unit (PPU), a DSP, an image processor, a co-processor, or others. Though referenced as the processor 304 at one or more points throughout the specification, it is understood that one or more processor(s) 304 can be used in one or more implementations described herein, including combinations of processors 304. In some implementations, the input 302 can be connected with sensors 306 (e.g., the sensor system 220 of the vehicle 200, sensors available via infrastructure, etc.), microphones, or other active or passive input devices or systems. In further implementations, the computing device 300 can include a connection 308. The connection 308, which can be wired or wireless, can allow the computing device 300 to communicate with other computing devices, locally or remotely, such as over a network protocol (e.g., Ethernet or similar protocols). The connection 308 can further be connected with remote devices associated with other computing devices, such as the sensors system 220 and the data store 215 as described with reference to the vehicle 200.

The computing device 300 can further comprise memory, such as memory 310. The memory 310 can include volatile and/or non-volatile memory. Examples of suitable memory 310 include RAM, flash memory, ROM, PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 310 can be a component of the processor(s) 304, or the memory 310 can be operably connected to the processor(s) 304 for use thereby. The memory 310 can include one or more modules that include computer-readable instructions that, when executed by the processor 304, cause the processor 304 to perform methods and functions that are discussed herein. The memory 310 can include one or more databases or portions thereof. The memory 310 can further contain information related to a reference material for comparison and/or analysis purposes.

The computing device 300 can also include an output 312 for conveying or transmitting output in a fashion which is usable by the vehicle 200, a requesting device, a connected device, a user. In one or more implementations, the output 312 is a video display, a speaker, a projector, an appropriate connection for any of the above devices, or other output devices or connections. In one or more examples, the output 312 can convey output to a screen for convenient viewing (e.g., display device 320) or to a control device. Though the input 302 and the output 312 are presented here as separate elements of the computing device 300, it is understood that, in one or more implementations, the input 302 and the output 312 can be the same device, connection or system, as desired.

The computing device 300 further includes the occupant verification system 260 that is implemented to perform methods and other functions as disclosed herein relating to reputation-based device communications. The occupant verification system 260 includes a plurality of modules to perform the functions described herein, including a communication module 420, a evaluation module 430 and an occupant analysis module 440. In one or more implementations, the occupant verification system 260 can communicate via a wired or wireless connection, depicted as a network 270, with local or remote devices, such as to receive information regarding the requesting device, connected devices, consulting systems, or others. In one or more implementations, the occupant verification system 260 can communicate with the vehicle 200, with a server 272, with another computing device 300, or combinations thereof. Further, the occupant verification system 260 can affect communication within the computing device 300, such as between one or more connected devices to correlate registration parameters and functionality as discussed herein. The occupant verification system 260 can be in communication with the blockchain database to approve and assign the connection between the one or more requesting devices, the one or more connected devices, and/or the vehicle 200 to provide an established connection, as described herein.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 2-6, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. An occupant verification system for occupant authentication and trust, comprising:
   one or more processors; and
   a memory communicably coupled to the one or more processors and storing:
      a communication module including instructions that when executed by the one or more processors cause the one or more processors to receive, from a vehicle, a verification request that includes at least an occupant identifier that uniquely identifies a designated occupant and a vehicle identifier that uniquely identifies the vehicle;

an evaluation module including instructions that when executed by the one or more processors cause the one or more processors to in response to verifying, in a blockchain, that the occupant identifier and the vehicle identifier correspond with identifying information for the designated occupant and the vehicle, record, in the blockchain, an entry indicating an occupant identity, a vehicle identity, and that the designated occupant is present in the vehicle; and an occupant analysis module including instructions that when executed by the one or more processors cause the one or more processors to using the occupant identity, collect one or more occupant profile elements that indicate trustworthiness of the designated occupant, including historical elements and personality profile elements about the designated occupant, the occupant profile elements being incorporated into the blockchain, and to distribute the occupant identity, the vehicle identity, and the occupant profile elements to one or more end users.

2. The occupant verification system of claim 1, wherein the verifying includes parsing the blockchain to determine if the designated occupant is authenticated and/or that biometric data for the designated occupant corresponds to stored biometric data for the designated occupant.

3. The occupant verification system of claim 1, wherein the verifying includes verifying that an occupant location corresponds to a vehicle location.

4. The occupant verification system of claim 1, wherein the occupant analysis module includes further instructions to provide a guarantee to an occupant responsive device, wherein the occupant responsive device is a device for the one or more end users for confirming occupant related criteria.

5. The occupant verification system of claim 4, wherein providing the guarantee includes instructions to transmit the guarantee as a confirmation that a threshold number of occupants including the designated occupant is riding within the vehicle.

6. The occupant verification system of claim 4, wherein providing the guarantee includes instructions to transmit a passport identity that is authenticated in the blockchain.

7. The occupant verification system of claim 4, wherein providing the guarantee includes instructions to transmit an assurance that the designated occupant satisfies one or more standards for ridesharing.

8. The occupant verification system of claim 1, further comprising instructions to plan a shared ride with additional occupants.

9. A non-transitory computer-readable medium for occupant authentication and trust and storing instructions that when executed by one or more processors cause the one or more processors to:

receive, from a vehicle, a verification request that includes at least an occupant identifier that uniquely identifies a designated occupant and a vehicle identifier that uniquely identifies the vehicle;

in response to verifying, in a blockchain, that the occupant identifier and the vehicle identifier correspond with identifying information for the designated occupant and the vehicle, record, in the blockchain, an entry indicating an occupant identity, a vehicle identity, and that the designated occupant is present in the vehicle;

using the occupant identity, collect one or more occupant profile elements that indicate trustworthiness of the designated occupant, including historical elements and personality profile elements about the designated occupant, the occupant profile elements being incorporated into the blockchain; and distribute the occupant identity, the vehicle identity, and the occupant profile elements to one or more end users.

10. The non-transitory computer-readable medium of claim 9, wherein the verifying includes instructions to parse the blockchain to determine if the designated occupant is authenticated and/or that biometric data for the designated occupant corresponds to stored biometric data for the designated occupant.

11. The non-transitory computer-readable medium of claim 9, wherein the verifying includes instructions to verify that an occupant location corresponds to a vehicle location.

12. The non-transitory computer-readable medium of claim 9, further comprising instructions to provide a guarantee to an occupant responsive device, wherein the occupant responsive device is a device for the one or more end users for confirming occupant related criteria.

13. The non-transitory computer-readable medium of claim 12, wherein providing the guarantee includes instructions to transmit the guarantee as a confirmation that a threshold number of occupants including the designated occupant is riding within the vehicle.

14. The non-transitory computer-readable medium of claim 12, wherein providing the guarantee includes instructions to transmit a passport identity that is authenticated in the blockchain.

15. The non-transitory computer-readable medium of claim 12, wherein providing the guarantee includes instructions to transmit an assurance that the designated occupant satisfies one or more standards for ridesharing.

16. A method for occupant authentication and trust, comprising:

receiving, from a vehicle, a verification request that includes at least an occupant identifier that uniquely identifies a designated occupant and a vehicle identifier that uniquely identifies the vehicle;

in response to verifying, in a blockchain, that the occupant identifier and the vehicle identifier correspond with identity information for the designated occupant and the vehicle, recording, in the blockchain, an entry indicating an occupant identity, a vehicle identity, and that the designated occupant is present in the vehicle;

using the occupant identity, collecting one or more occupant profile elements that indicate trustworthiness of the designated occupant, including historical elements and personality profile elements about the designated occupant, the occupant profile elements being incorporated into the blockchain; and distributing the occupant identity, the vehicle identity, and the occupant profile elements to one or more end users.

17. The method of claim 16, wherein the verifying includes parsing the blockchain to determine if the designated occupant is authenticated and/or that biometric data for the designated occupant corresponds to stored biometric data for the designated occupant.

18. The method of claim 16, wherein the verifying includes verifying that an occupant location corresponds to a vehicle location.

19. The method of claim 16, further comprising providing a guarantee to an occupant responsive device, wherein the occupant responsive device is a device for the one or more end users for confirming occupant related criteria.

20. The method of claim 19, wherein providing the guarantee includes transmitting the guarantee as a confirmation that a threshold number of occupants including the designated occupant is riding within the vehicle.

\* \* \* \* \*